(12) United States Patent
Mochizuki

(10) Patent No.: US 11,761,800 B2
(45) Date of Patent: *Sep. 19, 2023

(54) CORRECTION APPARATUS FOR ANGLE SENSOR, AND ANGLE SENSOR

(71) Applicant: TDK CORPORATION, Tokyo (JP)

(72) Inventor: Shinichirou Mochizuki, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/691,304

(22) Filed: Mar. 10, 2022

(65) Prior Publication Data

US 2022/0196446 A1     Jun. 23, 2022

Related U.S. Application Data

(63) Continuation of application No. 16/513,051, filed on Jul. 16, 2019, now Pat. No. 11,307,065.

(30) Foreign Application Priority Data

Jul. 23, 2018   (JP) .................. 2018-137373

(51) Int. Cl.
   *G01D 18/00*      (2006.01)
   *G01D 5/16*       (2006.01)
   *G01D 5/14*       (2006.01)

(52) U.S. Cl.
   CPC .............. *G01D 18/00* (2013.01); *G01D 5/16* (2013.01); *G01D 5/145* (2013.01); *G01D 18/002* (2013.01)

(58) Field of Classification Search
   CPC ...... G01D 18/00; G01D 18/002; G01D 3/036; G01D 5/145; G01D 5/16

USPC .......................................... 702/94
   See application file for complete search history.

(56) References Cited

U.S. PATENT DOCUMENTS

| | | | | |
|---|---|---|---|---|
| 10,836,429 B2* | 11/2020 | Watanabe | .......... | B62D 15/0245 |
| 10,969,400 B2* | 4/2021 | Shibuya | .................. | H02P 23/14 |
| 11,307,065 B2* | 4/2022 | Mochizuki | ............. | G01D 3/036 |
| 2002/0158680 A1* | 10/2002 | Pertus | ................. | H03M 1/0621 |
| | | | | 327/362 |
| 2004/0143400 A1* | 7/2004 | Frey | .................... | G01D 18/008 |
| | | | | 702/57 |

(Continued)

FOREIGN PATENT DOCUMENTS

| DE | 102019119672 A1 | 1/2020 |
|---|---|---|
| DE | 102019119896 A1 | 1/2020 |

(Continued)

*Primary Examiner* — Ly D Pham
(74) *Attorney, Agent, or Firm* — Oliff PLC

(57) ABSTRACT

An angle sensor generates an angle detection value based on a first and a second detection signal. A correction apparatus performs correction processing for generating a first corrected detection signal by adding a first correction value to the first detection signal and generating a second corrected detection signal by adding a second correction value to the second detection signal. When an angle to be detected varies with a period T and if no correction processing is performed, the angle detection value contains an Nth-order angle error component varying with a period of T/N. Each of the first and second detection signals contains an (N−1)th-order signal error component and an (N+1)th-order signal error component. The order of the first and second correction values is N−1 or N+1.

18 Claims, 14 Drawing Sheets

(56) References Cited

U.S. PATENT DOCUMENTS

| | | | |
|---|---|---|---|
| 2007/0288187 A1 | 12/2007 | Finkler et al. | |
| 2015/0036011 A1* | 2/2015 | Wakamatsu | H04N 23/6812 |
| | | | 348/208.7 |
| 2017/0314975 A1* | 11/2017 | Mochizuki | G01D 5/24476 |
| 2017/0370747 A1* | 12/2017 | Uchida | G01D 5/24485 |
| 2018/0022386 A1* | 1/2018 | Watanabe | B62D 5/049 |
| | | | 702/151 |
| 2018/0095146 A1* | 4/2018 | Uchida | G01D 5/24495 |
| 2020/0025551 A1* | 1/2020 | Mochizuki | G01B 7/30 |

FOREIGN PATENT DOCUMENTS

| | | |
|---|---|---|
| DE | 102020102944 A1 | 9/2020 |
| JP | 2008-304249 A | 12/2008 |
| JP | 2017201284 A | 11/2017 |

* cited by examiner

CORRECTION APPARATUS FOR ANGLE SENSOR, AND ANGLE SENSOR

This is a Continuation of Application No. 16/513,051 filed Jul. 16, 2019, which claims the benefit of Japanese Patent Application No. 2018-137373 filed Jul. 23, 2018. The disclosure of the prior applications is hereby incorporated by reference herein in its entirety.

BACKGROUND OF THE INVENTION

1. Field of the Invention

The present invention relates to a correction apparatus for correcting errors in an angle sensor configured to generate an angle detection value having a correspondence with an angle to be detected, and to an angle sensor including the correction apparatus.

2. Description of the Related Art

In recent years, angle sensors have been widely used in various applications, such as detection of the rotational position of a steering wheel or a power steering motor in an automobile. The angle sensors generate an angle detection value having a correspondence with an angle to be detected. Examples of the angle sensors include a magnetic angle sensor. A system using the magnetic angle sensor is typically provided with a magnetic field generator for generating a rotating magnetic field whose direction rotates in response to the rotation or linear movement of an object. The magnetic field generator is a magnet, for example. An example of angles to be detected by the magnetic angle sensor is an angle corresponding to the rotational position of the magnet. For example, the magnetic angle sensor detects the foregoing rotating magnetic field and generates, as the angle detection value, a value representing the angle that a direction of the rotating magnetic field at a reference position forms with respect to a reference direction in a reference plane.

A type of angle sensor is known that includes a detection signal generator for generating first and second detection signals 90° different in phase from each other and generates an angle detection value by performing operations using the first and second detection signals. The detection signal generator includes a first detection circuit for outputting the first detection signal, and a second detection circuit for outputting the second detection signal. The first and second detection circuits each include at least one magnetic detection element. The magnetic detection element includes, for example, a spin-valve magnetoresistive (MR) element including a magnetization pinned layer whose magnetization direction is pinned, a free layer whose magnetization direction changes with the direction of the rotating magnetic field, and a gap layer located between the magnetization pinned layer and the free layer.

When a magnetic angle sensor is detecting an angle that varies at a constant velocity, each of the first and second detection signals should ideally have a sinusoidal waveform (including a sine waveform and a cosine waveform). However, each detection signal may sometimes have a waveform distorted from a sinusoidal one. In such cases, the first detection signal contains a first ideal component which varies in an ideally sinusoidal manner, and one or more signal error components other than the first ideal component. Likewise, the second detection signal contains a second ideal component which varies in an ideally sinusoidal manner, and one or more signal error components other than the second ideal component. A distortion of the waveform of each detection signal may result in some error in the angle detection value. An error occurring in the angle detection value will hereinafter be referred to as an angle error.

If the angle to be detected varies with a period T, the angle error can contain a component varying with a period of T/N, where N is an integer greater than or equal to 1. Such a component will hereinafter be referred to as an Nth-order angle error component.

Assume here that the angle to be detected is $\theta$, the first ideal component is proportional to $\sin\theta$, and the second ideal component is proportional to $\cos\theta$. The first detection signal can contain a signal error component proportional to $\sin(M\theta+\alpha)$, and the second detection signal can contain a signal error component proportional to $\cos(M\theta+\alpha)$, where M is an integer greater than or equal to 0, and $\alpha$ is a predetermined angle. These signal error components are herein defined as Mth-order signal error components. M represents the order of each signal error component.

An angle error can result when each of the first and second detection signals contains two signal error components of mutually different orders. A typical method for reducing the angle error in such a case is to add to the first detection signal such a first correction value as to cancel out the two signal error components of the first detection signal, and add to the second detection signal such a second correction value as to cancel out the two signal error components of the second detection signal. The first correction value used in this method contains two components having their respective periods the same as the periods of the two signal error components of the first detection signal. Similarly, the second correction value contains two components having their respective periods the same as the periods of the two signal error components of the second detection signal. Such a method is described in US 2007/0288187A1 and JP 2008-304249A, for example.

US 2017/0314975A1 describes a technique for reducing a fourth-order angle error component occurring when each of the first and second detection signals contains third- and fifth-order signal error components. The technique reduces the fourth-order angle error component by adding a first correction value to the first detection signal and adding a second correction value to the second detection signal. According to the technique, the first correction value has a first amplitude and varies with a first period. The second correction value has a second amplitude and varies with a second period. The first and second amplitudes are of the same value. The first and second periods are of the same value that is ⅓ or ⅕ the period T.

An Nth-order angle error component can result when each of the first and second detection signals contains two signal error components of mutually different orders. Methods for reducing the Nth-order angle error component in such a case will be discussed below.

According to the foregoing typical method, each of the first and second correction values contains two components having their respective periods. This makes the first and second correction values complicated, and consequently complicates the processing for reducing the Nth-order angle error component.

The technique described in US 2017/0314975A1 is able to reduce the 4th-order angle error component, but unable to reduce any Nth-order angle error components where N is other than 4.

SUMMARY OF THE INVENTION

It is an object of the present invention to provide a correction apparatus for an angle sensor, and an angle sensor that are capable of reducing an Nth-order angle error component that results when each of a first and a second detection signal contains two signal error components of mutually different orders, with simple processing regardless of the value of N.

According to each of first and second aspects of the present invention, there is provided a correction apparatus for use with an angle sensor, the angle sensor including: a detection signal generator for generating a first detection signal and a second detection signal each having a correspondence with an angle to be detected; and an angle detector for generating an angle detection value based on the first and second detection signals, the angle detection value having a correspondence with the angle to be detected. The correction apparatus is configured to correct the first and second detection signals.

According to the first aspect of the invention, there is provided an angle sensor including the foregoing detection signal generator, the foregoing angle detector, and the correction apparatus according to the first aspect of the invention. According to the second aspect of the invention, there is provided an angle sensor including the foregoing detection signal generator, the foregoing angle detector, and the correction apparatus according to the second aspect of the invention.

According to each of the first and second aspects of the invention, the correction apparatus includes a correction processor configured to perform correction processing for generating a first corrected detection signal by adding a first correction value to the first detection signal and generating a second corrected detection signal by adding a second correction value to the second detection signal.

The first detection signal contains a first ideal component, a first signal error component, and a second signal error component. The second detection signal contains a second ideal component, a third signal error component, and a fourth signal error component. The first ideal component is expressed as $A_0 \sin\theta$, the second ideal component is expressed as $A_0 \cos\theta$, the first signal error component is expressed as $-A_1 \sin((N-1)\theta+\alpha)$, the second signal error component is expressed as $-A_2 \sin((N+1)\theta+\alpha)$, the third signal error component is expressed as $A_1 \cos((N-1)\theta+\alpha)$, and the fourth signal error component is expressed as $-A_2 \cos((N+1)\theta+\alpha)$, where $\theta$ represents the angle to be detected; N is an integer greater than or equal to 1; $A_0$, $A_1$, and $A_2$ are real numbers other than 0; and $\alpha$ is a predetermined angle.

The angle detection value without the correction processing is referred to as an uncorrected angle detection value $\theta p$. The uncorrected angle detection value $\theta p$ contains an error. When the angle $\theta$ to be detected varies with a predetermined period T, the error of the uncorrected angle detection value $\theta p$ contains a component resulting from the first to fourth signal error components and varying with a period of T/N.

In the correction apparatus according to the first aspect of the invention, the first correction value is expressed as $-A_3 \sin((N-1)\theta p+\alpha)$, and the second correction value is expressed as $A_3 \cos((N-1)\theta p+\alpha)$, where $A_3$ is a real number such that $|A_1+A_2+A_3|$ is less than $|A_1+A_2|$. $|A_1+A_2+A_3|$ may be less than or equal to $|A_1+A_2|\times 0.5$, or may be 0.

In the correction apparatus according to the second aspect of the invention, the first correction value is expressed as $-A_4 \sin((N+1)\theta p+\alpha)$, and the second correction value is expressed as $-A_4 \cos((N+1)\theta p+\alpha)$, where $A_4$ is a real number such that $|A_1+A_2+A_4|$ is less than $|A_1+A_2|$. $|A_1+A_2+A_4|$ may be less than or equal to $-A_1+A_2|\times 0.5$, or may be 0.

In the angle sensor according to each of the first and second aspects of the invention, the first detection signal may have a correspondence with the sine of a rotating field angle, and the second detection signal may have a correspondence with the cosine of the rotating field angle. The rotating field angle is an angle that the direction of a rotating magnetic field at a reference position forms with respect to a reference direction in a reference plane, and that has a correspondence with the angle to be detected.

With the correction apparatus and angle sensor according to each of the first and second aspects of the invention, reduction of an Nth-order angle error component occurring when each of first and second detection signals contains two signal error components of mutually different orders is achieved with simple processing regardless of the value of N.

Other and further objects, features and advantages of the present invention will appear more fully from the following description.

DETAILED DESCRIPTION OF THE PREFERRED EMBODIMENTS

First Embodiment

Preferred embodiments of the present invention will now be described in detail with reference to the drawings. First, reference is made to FIG. 1 to describe a schematic configuration of an angle sensor system including an angle sensor according to a first embodiment of the invention.

Figure 1:
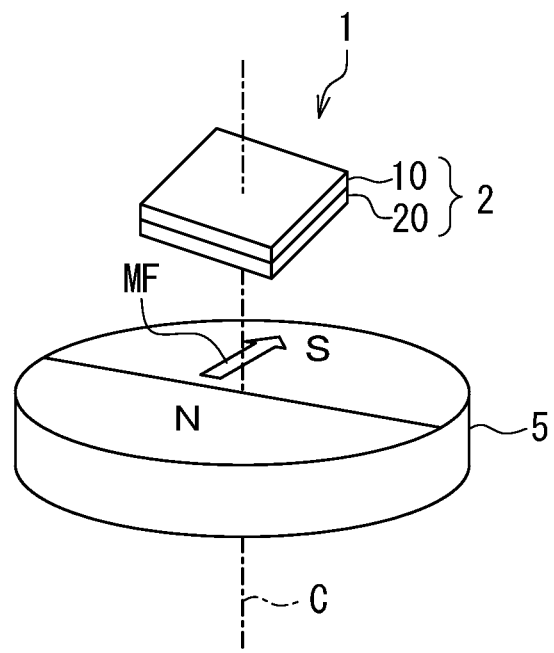
FIG. 1 is a perspective view illustrating a schematic configuration of an angle sensor system including an angle sensor according to a first embodiment of the invention.

The angle sensor system shown in FIG. 1 includes a magnetic field generator and the angle sensor 1 according to the first embodiment. The angle sensor 1 is specifically a magnetic angle sensor.

FIG. 1 shows an example in which the magnetic field generator is a magnet 5 in the shape of a cylinder having a central axis. The magnet 5 has an N pole and an S pole that are arranged symmetrically with respect to an imaginary plane including the aforementioned central axis. The magnet 5 rotates about the central axis and thereby generates a rotating magnetic field MF. The rotating magnetic field MF is a magnetic field that rotates about a center of rotation C including the aforementioned central axis.

The angle sensor 1 is configured to generate an angle detection value $\theta s$ having a correspondence with an angle to be detected. Hereinafter, the angle to be detected will be referred to as detection-target angle, and denoted by a symbol $\theta$. The detection-target angle $\theta$ in the present embodiment is an angle corresponding to the rotational position of the magnet 5.

Figure 2:
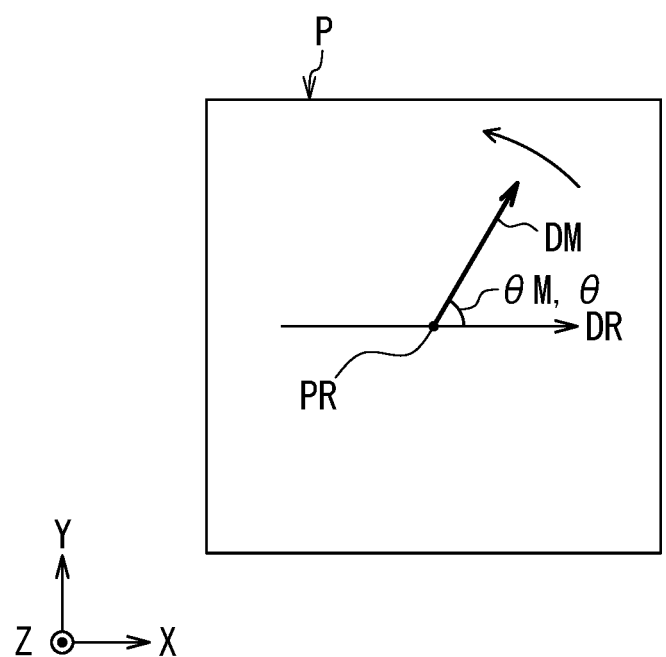
FIG. 2 is an explanatory diagram illustrating a reference plane in the first embodiment of the invention.

The angle sensor 1 detects the rotating magnetic field MF and generates, as the angle detection value $\theta s$, a value representing a rotating field angle $\theta M$ having a correspondence with the detection-target angle $\theta$. The rotating field angle $\theta M$ is an angle that the direction DM of the rotating magnetic field MF at a reference position PR forms with respect to a reference direction DR in a reference plane P. FIG. 2 illustrates the reference plane P, the reference position PR, the direction DM of the rotating magnetic field MF, the reference direction DR, and the rotating field angle $\theta M$.

Now, definitions of directions used in the present embodiment will be described with reference to FIG. 1 and FIG. 2. First, Z direction is defined as the direction parallel to the center of rotation C shown in FIG. 1 and from bottom to top in FIG. 1. FIG. 2 illustrates the Z direction as the direction out of the plane of the drawing. X and Y directions are defined as two mutually orthogonal directions perpendicular to the Z direction. FIG. 2 illustrates the X direction as the rightward direction, and the Y direction as the upward direction. Further, −X direction refers to the direction opposite to the X direction, and −Y direction refers to the direction opposite to the Y direction.

The reference plane P is an imaginary plane parallel to one end face of the magnet 5. The reference position PR is the position where the angle sensor 1 detects the rotating magnetic field MF. The reference direction DR is in the reference plane P and intersects the reference position PR. The direction DM of the rotating magnetic field MF at the reference position PR is also in the reference plane P. The angle sensor 1 is disposed to face the aforementioned end face of the magnet 5. In the present embodiment, the reference direction DR is the X direction. In the reference plane P the direction DM of the rotating magnetic field MF rotates about the reference position PR. In the present embodiment, it is assumed that the direction DM of the rotating magnetic field MF rotates counterclockwise in FIG. 2. The rotating field angle $\theta M$ is expressed in positive values when viewed in the counterclockwise direction from the reference direction DR, and in negative values when viewed in the clockwise direction from the reference direction DR.

In the present embodiment, the rotating field angle $\theta M$ coincides with the detection-target angle $\theta$ if the magnet 5 generates an ideal rotating magnetic field MF. FIG. 2 shows the detection-target angle $\theta$ in such a case. However, the rotating field angle θM is not always ideal and may slightly differ from the detection-target angle θ due to uneven magnetization of the magnet 5 or other factors. This is a cause of an error occurring in the angle detection value θs.

The angle sensor system of the present embodiment may be configured in other ways than illustrated in FIG. 1. The angle sensor system of the present embodiment need only be configured to vary the relative positional relationship between the magnetic field generator and the angle sensor 1 such that the direction DM of the rotating magnetic field MF at the reference position PR rotates when viewed from the angle sensor 1. For example, the magnet 5 and the angle sensor 1 arranged as illustrated in FIG. 1 may be configured so that: the angle sensor 1 rotates while the magnet 5 is fixed; the magnet 5 and the angle sensor 1 rotate in mutually opposite directions; or the magnet 5 and the angle sensor 1 rotate in the same direction with mutually different angular velocities.

Alternatively, as the magnetic field generator, a magnet including one or more pairs of N and S poles arranged alternately in an annular shape may be employed in place of the magnet 5, and the angle sensor 1 may be placed in the vicinity of the outer circumference of the magnet. In such a case, at least one of the magnet and the angle sensor 1 rotates.

Alternatively, as the magnetic field generator, a magnetic scale that includes a plurality of pairs of N and S poles arranged alternately in a liner configuration may be employed in place of the magnet 5, and the angle sensor 1 may be placed in the vicinity of the periphery of the magnetic scale. In such a case, at least one of the magnetic scale and the angle sensor 1 moves linearly in the direction in which the N and S poles of the magnetic scale are arranged.

In the above-described various configurations of the angle sensor system, there also exists the reference plane P having a predetermined positional relationship with the angle sensor 1. In the reference plane P, the direction DM of the rotating magnetic field MF rotates about the reference position PR when viewed from the angle sensor 1.

Figure 3:
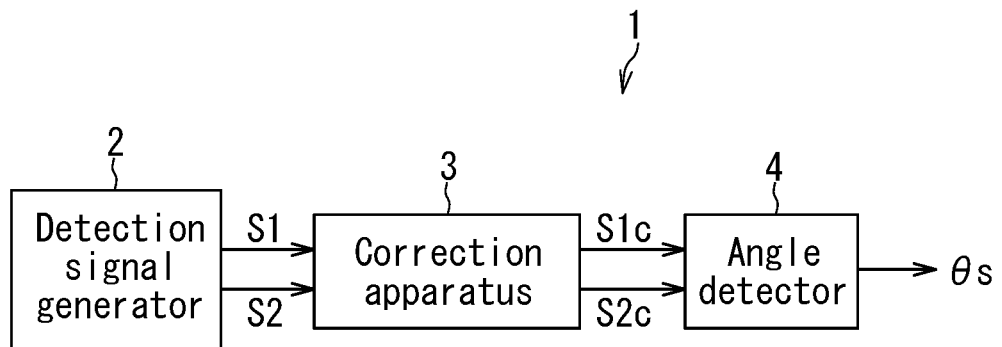
FIG. 3 is a block diagram illustrating the configuration of the angle sensor according to the first embodiment of the invention.

FIG. 3 is a block diagram illustrating the configuration of the angle sensor 1. As shown in FIG. 3, the angle sensor 1 includes: a detection signal generator 2 for generating a first detection signal S1 and a second detection signal S2 each having a correspondence with the detection-target angle θ; an angle detector 4 for generating, based on the first and second detection signals 51 and S2, the angle detection value θs having a correspondence with the detection-target angle θ; and a correction apparatus 3 according to the present embodiment.

In the present embodiment, specifically, the first detection signal S1 has a correspondence with the sine of the rotating field angle θM, and the second detection signal S2 has a correspondence with the cosine of the rotating field angle θM.

The correction apparatus 3 is an apparatus for correcting the first and second detection signals S1 and S2. The correction apparatus 3 corrects the first detection signal S1 to generate a first corrected detection signal S1c, and corrects the second detection signal S2 to generate a second corrected detection signal S2c, and supplies the first and second corrected detection signals S1c and S2c to the angle detector 4. The angle detector 4 generates the angle detection value θs using the first and second corrected detection signals S1c and S2c.

As shown in FIG. 1, the detection signal generator 2 includes a first detection circuit 10 for generating the first detection signal S1 and a second detection circuit 20 for generating the second detection signal S2. For ease of understanding, FIG. 1 illustrates the first and second detection circuits 10 and 20 as separate components. However, the first and second detection circuits 10 and 20 may be integrated into a single component. Further, while in FIG. 1 the first and second detection circuits 10 and 20 are stacked in a direction parallel to the center of rotation C, the order of stacking is not limited to the example shown in FIG. 1. Each of the first and second detection circuits 10 and 20 includes at least one magnetic detection element for detecting the rotating magnetic field MF.

Figure 4:
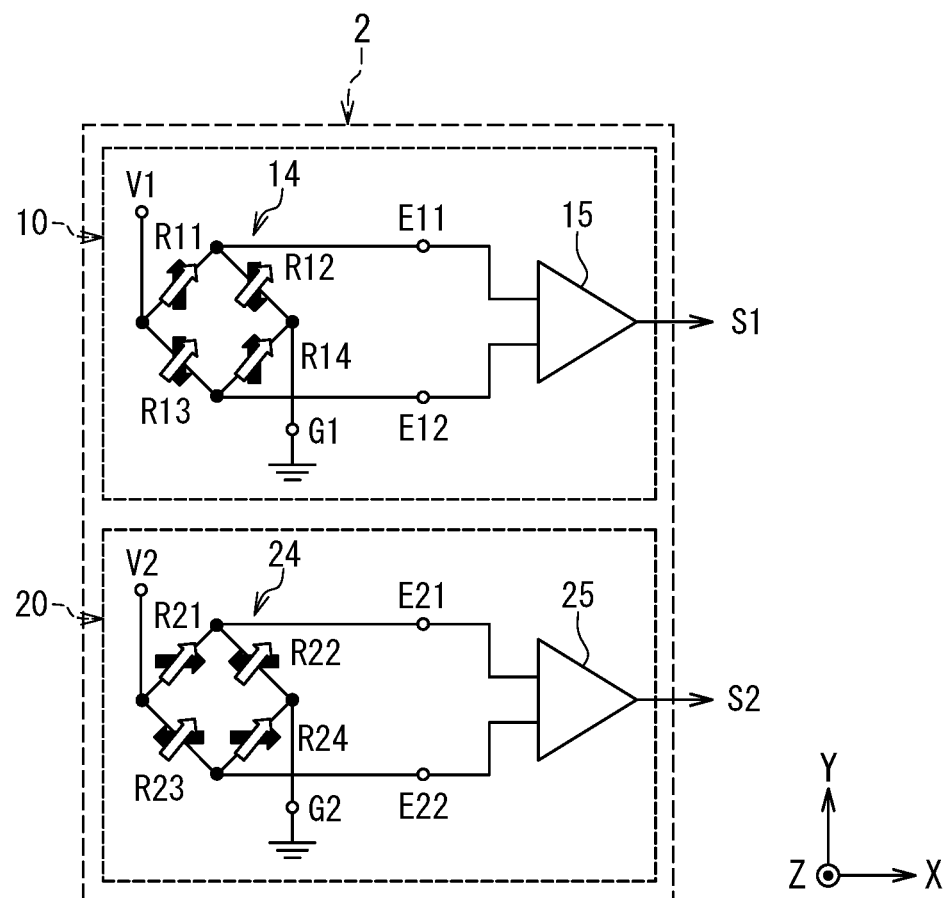
FIG. 4 is a circuit diagram illustrating the configuration of a detection signal generator in FIG. 3.

The configuration of the detection signal generator 2 will now be described in detail with reference to FIG. 4. FIG. 4 is a circuit diagram illustrating the configuration of the detection signal generator 2. As mentioned above, the detection signal generator 2 includes the first detection circuit 10 for generating the first detection signal S1 and the second detection circuit 20 for generating the second detection signal S2.

The first detection circuit 10 includes a Wheatstone bridge circuit 14 and a difference detector 15. The Wheatstone bridge circuit 14 includes four magnetic detection elements R11, R12, R13 and R14, a power supply port V1, a ground port G1, and two output ports E11 and E12. The magnetic detection element R11 is provided between the power supply port V1 and the output port E11. The magnetic detection element R12 is provided between the output port E11 and the ground port G1. The magnetic detection element R13 is provided between the power supply port V1 and the output port E12. The magnetic detection element R14 is provided between the output port E12 and the ground port G1. A power supply voltage of predetermined magnitude is applied to the power supply port V1. The ground port G1 is connected to the ground. The difference detector 15 outputs a signal corresponding to the potential difference between the output ports E11 and E12 as the first detection signal S1.

The circuit configuration of the second detection circuit 20 is similar to that of the first detection circuit 10. More specifically, the second detection circuit 20 includes a Wheatstone bridge circuit 24 and a difference detector 25. The Wheatstone bridge circuit 24 includes four magnetic detection elements R21, R22, R23 and R24, a power supply port V2, a ground port G2, and two output ports E21 and E22. The magnetic detection element R21 is provided between the power supply port V2 and the output port E21. The magnetic detection element R22 is provided between the output port E21 and the ground port G2. The magnetic detection element R23 is provided between the power supply port V2 and the output port E22. The magnetic detection element R24 is provided between the output port E22 and the ground port G2. A power supply voltage of predetermined magnitude is applied to the power supply port V2. The ground port G2 is connected to the ground. The difference detector 25 outputs a signal corresponding to the potential difference between the output ports E21 and E22 as the second detection signal S2.

The magnetic detection elements R11 to R14 and R21 to R24 may each include a plurality of magnetoresistive (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction changes with the direction DM of the rotating magnetic field MF at the reference position PR, and a gap layer located between the magnetization pinned layer and the free layer.

The spin-valve MR element may be a tunneling magnetoresistive (TMR) element or a giant magnetoresistive (GMR) element. In the TMR element, the gap layer is a tunnel barrier layer. In the GMR element, the gap layer is a nonmagnetic conductive layer. The resistance of the spin-valve MR element changes with the angle that the magnetization direction of the free layer forms with respect to the magnetization direction of the magnetization pinned layer. The resistance of the spin-valve MR element is at its minimum value when the foregoing angle is 0°, and at its maximum value when the foregoing angle is 180°. In FIG. 4, the filled arrows indicate the magnetization directions of the magnetization pinned layers of the MR elements, and the hollow arrows indicate the magnetization directions of the free layers of the MR elements.

In the first detection circuit 10, the magnetization pinned layers of the MR elements included in the magnetic detection elements R11 and R14 are magnetized in the Y direction, and the magnetization pinned layers of the MR elements included in the magnetic detection elements R12 and R13 are magnetized in the −Y direction. In this case, the potential difference between the output ports E11 and E12 changes with the sine of the rotating field angle θM. The first detection signal S1 thus has a correspondence with the sine of the rotating field angle θM. Since the rotating field angle θM has a correspondence with the detection-target angle θ, the first detection signal S1 has a correspondence with the detection-target angle θ.

In the second detection circuit 20, the magnetization pinned layers of the MR elements included in the magnetic detection elements R21 and R24 are magnetized in the X direction, and the magnetization pinned layers of the MR elements included in the magnetic detection elements R22 and R23 are magnetized in the −X direction. In this case, the potential difference between the output ports E21 and E22 changes with the cosine of the rotating field angle θM. The second detection signal S2 thus has a correspondence with the cosine of the rotating field angle θM. Since the rotating field angle θM has a correspondence with the detection-target angle θ, the second detection signal S2 has a correspondence with the detection-target angle θ.

In consideration of the production accuracy of the MR elements and other factors, the magnetization directions of the magnetization pinned layers of the MR elements in the detection circuits 10 and 20 may be slightly different from the above-described directions.

Figure 5:
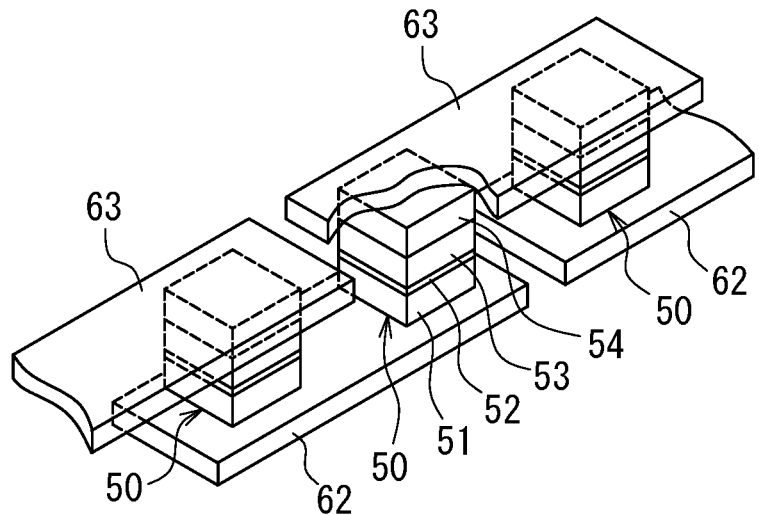
FIG. 5 is a perspective view of part of a magnetic detection element in FIG. 4.

An example configuration of the magnetic detection elements will now be described with reference to FIG. 5. FIG. 5 is a perspective view of part of a magnetic detection element in the detection signal generator 2 in FIG. 4. In this example, the magnetic detection element includes a plurality of lower electrodes 62, a plurality of MR elements 50 and a plurality of upper electrodes 63. The lower electrodes 62 are arranged on a substrate (not illustrated). The lower electrodes 62 each have a long slender shape. Every two lower electrodes 62 that are adjacent to each other in the longitudinal direction of the lower electrodes 62 have a gap therebetween. As shown in FIG. 5, MR elements 50 are provided on the top surface of the lower electrode 62 at positions near opposite ends in the longitudinal direction. Each MR element 50 includes a free layer 51, a gap layer 52, a magnetization pinned layer 53, and an antiferromagnetic layer 54 which are stacked in this order, from closest to farthest from the lower electrode 62. The free layer 51 is electrically connected to the lower electrode 62. The antiferromagnetic layer 54 is formed of an antiferromagnetic material, and is in exchange coupling with the magnetization pinned layer 53 to thereby pin the magnetization direction of the magnetization pinned layer 53. The upper electrodes 63 are arranged over the MR elements 50. Each upper electrode 63 has a long slender shape, and establishes electrical connection between the respective antiferromagnetic layers 54 of two adjacent MR elements 50 that are arranged on two lower electrodes 62 adjacent in the longitudinal direction of the lower electrodes 62. With such a configuration, the MR elements 50 in the magnetic detection element shown in FIG. 5 are connected in series by the upper and lower electrodes 63 and 62. It should be appreciated that the layers 51 to 54 of the MR elements 50 may be stacked in the reverse order to that shown in FIG. 5.

Figure 6:
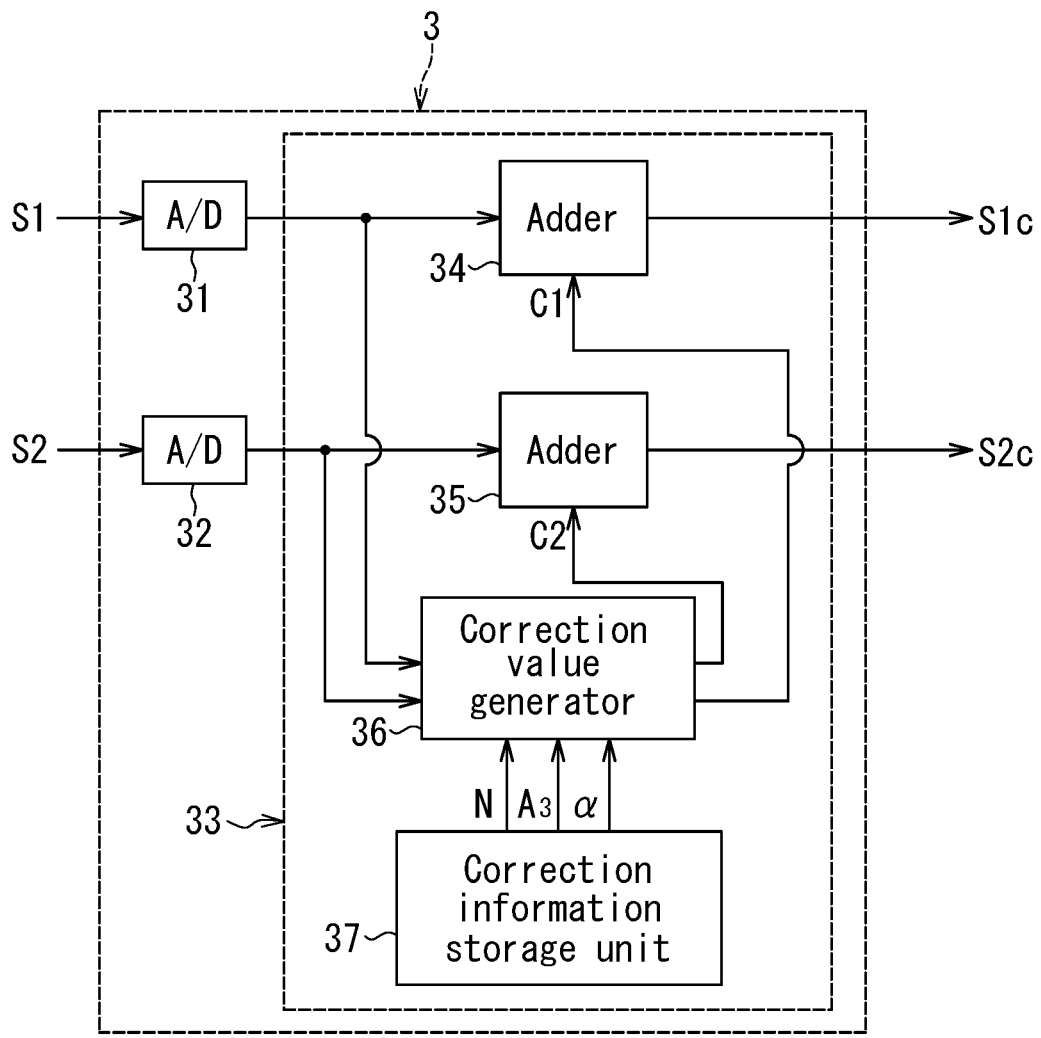
FIG. 6 is a functional block diagram illustrating the configuration of a correction apparatus in FIG. 3.

Next, reference is made to FIG. 6 to describe the configuration of the correction apparatus 3 in detail. FIG. 6 is a functional block diagram illustrating the configuration of the correction apparatus 3. The correction apparatus 3 includes analog-to-digital converters (hereinafter, "A/D converters") 31 and 32, and a correction processor 33. The correction processor 33 and the angle detector 4 use digital signals. The A/D converter 31 converts the first detection signal S1 into digital form. The A/D converter 32 converts the second detection signal S2 into digital form.

The correction processor 33 and the angle detector 4 can be implemented by an application-specific integrated circuit (ASIC) or a microcomputer, for example.

The correction processor 33 performs correction processing. The correction processing is processing to generate the first corrected detection signal S1c by adding a first correction value C1 to the first detection signal S1 converted into digital form by the A/D converter 31, and generate the second corrected detection signal S2c by adding a second correction value C2 to the second detection signal S2 converted into digital form by the A/D converter 32. In the following description, the first detection signal S1 to be handled in the correction processing refers to the one converted into digital form by the A/D converter 31, and the second detection signal S2 to be handled in the correction processing refers to the one converted into digital form by the A/D converter 32.

As mentioned previously, the first and second corrected detection signals S1c and S2c are supplied to the angle detector 4. The angle detector 4 generates the angle detection value θs using the first and second corrected detection signals S1c and S2c.

The correction processor 33 includes adders 34 and 35, a correction value generator 36, and a correction information storage unit 37. The adder 34 performs processing to add the first correction value C1 to the first detection signal S1 to generate the first corrected detection signal S1c. The adder 35 performs processing to add the second correction value C2 to the second detection signal S2 to generate the second corrected detection signal S2c.

The correction value generator 36 generates the first and second correction values C1 and C2, supplies the first correction value C1 to the adder 34, and supplies the second correction value C2 to the adder 35. The correction information storage unit 37 stores correction information that is necessary for the generation of the first and second correction values C1 and C2 by the correction value generator 36, and supplies the correction information to the correction value generator 36. The correction value generator 36 uses the first and second detection signals S1 and S2 and the correction information to generate the first and second correction values C1 and C2. The details of the correction processing will be described in detail later.

Now, a description will be given of error components of the first and second detection signals S1 and S2 and an error caused in the angle detection value θs by the error components.

As mentioned previously, in the present embodiment the first detection signal S1 has a correspondence with the sine of the rotating field angle θM, and the second detection signal S2 has a correspondence with the cosine of the rotating field angle θM. Ideally, the first detection signal S1 should be expressed as $A_0 \sin \theta$, and the second detection signal S2 as $A_0 \cos \theta$, where $A_0$ is a real number other than 0. In the present embodiment, $A_0 \sin \theta$ will be referred to as a first ideal component, and $A_0 \cos \theta$ as a second ideal component.

In actuality, the first detection signal S1 contains the first ideal component and one or more error components other than the first ideal component, and the second detection signal S2 contains the second ideal component and one or more error components other than the second ideal component. In the present embodiment, the one or more error components contained in each of the first and second detection signals S1 and S2 will be referred to as one or more signal error components.

There are broadly two causes of the one or more signal error components occurring in each of the first and second detection signals S1 and S2. A first cause is related to the rotating magnetic field MF. A second cause is related to the detection signal generator 2. The first cause is that, as mentioned previously, the rotating field angle θM fails to be an ideal one and thus differs slightly from the detection-target angle θ due to uneven magnetization of the magnet 5 or other factors. Specific examples of the second cause include the following situations: 1) the free layers 51 of MR elements 50 have magnetic anisotropy in the direction of magnetization of the magnetization pinned layers 53 of the MR elements 50; 2) the direction of magnetization of the magnetization pinned layers 53 of MR elements 50 fluctuates due to the effect of the rotating magnetic field MF or other factors; 3) the free layers 51 of MR elements 50 in the first detection circuit 10 and those in the second detection circuit 20 have magnetic anisotropy in the same direction; and 4) there is misalignment between the magnet 5 and the detection signal generator 2.

The one or more signal error components of each of the first and second detection signals S1 and S2 can be caused by at least one of the first cause and the second cause.

If no correction processing is performed, an error can occur in the angle detection value θs due to the one or more signal error components contained in each of the first and second detection signals S1 and S2. In the present embodiment, the error occurring in the angle detection value θs will be referred to as an angle error.

If the detection-target angle θ varies with a predetermined period T, the angle error can contain a component varying with a period of T/N, where N is an integer greater than or equal to 1. Such a component will hereinafter be referred to as an Nth-order angle error component.

The first detection signal S1 can contain a signal error component proportional to $\sin(M\theta+\alpha)$, and the second detection signal S2 can contain a signal error component proportional to $\cos(M\theta+\alpha)$, where M is an integer greater than or equal to 0, and α is a predetermined angle. Such signal error components are herein defined as Mth-order signal error components. M represents the order of each signal error component. In the present embodiment, signal error components are distinguished by the value of M.

Now, a description will be given of findings from researches by the inventor of the present invention about a relationship between signal error components and angle error components. For simplicity of description, suppose that the first detection signal S1 contains only the first ideal component ($A_0 \sin \theta$) and an Mth-order signal error component, and the second detection signal S2 contains only the second ideal component ($A_0 \cos \theta$) and an Mth-order signal error component. Suppose also that the Mth-order signal error component of the first detection signal S1 and the Mth-order signal error component of the second detection signal S2 have the same value of M and the same amplitude. In this case, the first detection signal S1 and the second detection signal S2 are expressed in a pair of Eqs. (1) and (2) or a pair of Eqs. (3) and (4) below, where $B_0$ is a real number other than 0.

$$S1 = A_0 \sin \theta - B_0 \sin(M\theta+\alpha) \quad (1)$$

$$S2 = A_0 \cos \theta + B_0 \cos(M\theta+\alpha) \quad (2)$$

$$S1 = A_0 \sin \theta - B_0 \sin(M\theta+\alpha) \quad (3)$$

$$S2 = A_0 \cos \theta - B_0 \cos(M\theta+\alpha) \quad (4)$$

In the pair of Eqs. (1) and (2), the terms of the Mth-order signal error components of the first and second detection signals S1 and S2 have different signs. In Eqs. (1) and (2), the term of the Mth-order signal error component of the first detection signal S1 has a sign "−", whereas the term of the Mth-order signal error component of the second detection signal S2 has a sign "+". However, the signs may be reversed.

In the pair of Eqs. (3) and (4), the terms of the Mth-order signal error components of the first and second detection signals S1 and S2 have the same sign. In Eqs. (3) and (4), both of the term of the Mth-order signal error component of the first detection signal S1 and the term of the Mth-order signal error component of the second detection signal S2 have a sign "−". However, the terms may both have a sign "+".

The inventor of the present invention has found the following first to third characteristics about the relationship between the signal error components and angle error components. The first characteristic is that with the first and second detection signals S1 and S2 expressed in the pair of Eqs. (1) and (2), an (M+1)th-order angle error component mainly occurs in the angle detection value θs if no correction processing is performed, whereas with the first and second detection signals S1 and S2 expressed in the pair of Eqs. (3) and (4), an (M−1)th-order angle error component mainly occurs in the angle detection value θs if no correction processing is performed.

The second characteristic is that the ratio of the amplitude of the main angle error component to $B_0$ does not differ between the case with the first and second detection signals S1 and S2 expressed in the pair of Eqs. (1) and (2) and the case with the first and second detection signals S1 and S2 expressed in the pair of Eqs. (3) and (4).

The third characteristic is that, in both of the case with the first and second detection signals S1 and S2 expressed in the pair of Eqs. (1) and (2) and the case with the first and second detection signals S1 and S2 expressed in the pair of Eqs. (3) and (4), the phase of the main angle error component is reversed depending on whether $B_0$ is a positive value or a negative value.

The foregoing first to third characteristics hold true regardless of the value of M, provided that M is an integer greater than or equal to 0.

FIGS. 7 to 10 show specific examples showing the foregoing first to third characteristics. In the examples, an angle error occurring in the angle detection value θs without the correction processing was determined on the assumption that M is 3, $A_0$ is 1, $B_0$ is 0.02 or −0.02, and α is 0. FIGS. 7 to 10 show first to fourth example waveforms of the angle error. In FIGS. 7 to 10, the horizontal axis represents the detection-target angle θ, and the vertical axis represents the angle error.

Figure 7:
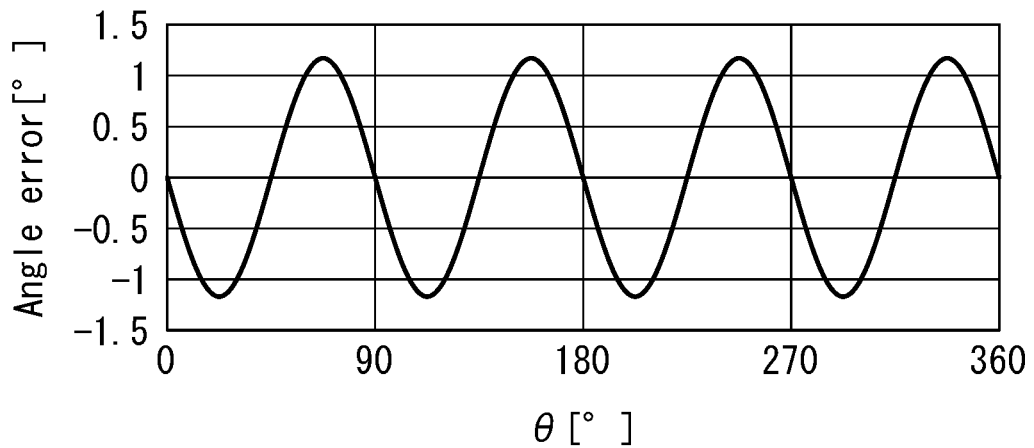
FIG. 7 is a waveform diagram illustrating a first example waveform of an angle error occurring in an angle detection value when no correction processing is performed.
Figure 8:
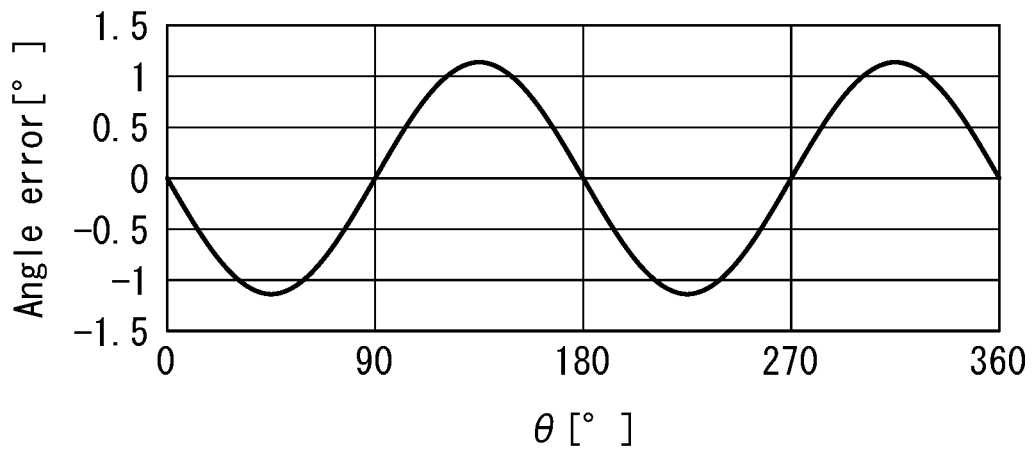
FIG. 8 is a waveform diagram illustrating a second example waveform of the angle error occurring in the angle detection value when no correction processing is performed.

FIG. 7 shows the waveform of the angle error in a case where $B_0$ is 0.02 and the first and second detection signals S1 and S2 are expressed in the pair of Eqs. (1) and (2). FIG. 8 shows the waveform of the angle error in a case where $B_0$ is 0.02 and the first and second detection signals S1 and S2 are expressed in the pair of Eqs. (3) and (4).

FIGS. 7 and 8 show the foregoing first and second characteristics. More specifically, the angle error shown in FIG. 7 mainly contains a fourth-order angle error component, and the angle error shown in FIG. 8 mainly contains a second-order angle error component. The fourth-order angle error component in FIG. 7 and the second-order angle error component in FIG. 8 have the same amplitude.

Figure 9:
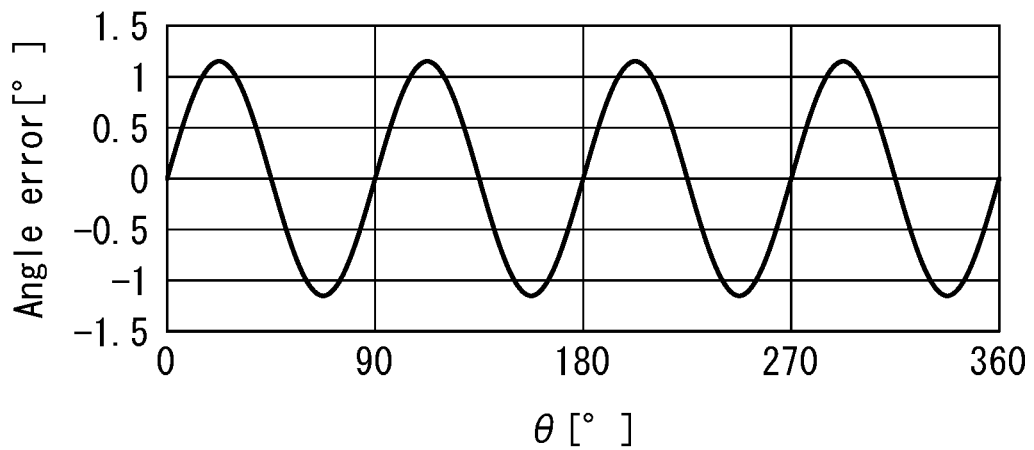
FIG. 9 is a waveform diagram illustrating a third example waveform of the angle error occurring in the angle detection value when no correction processing is performed.
Figure 10:
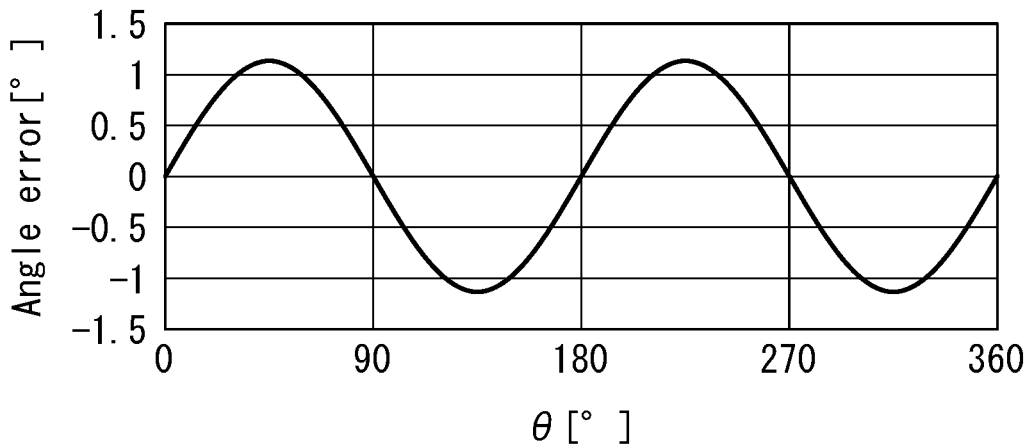
FIG. 10 is a waveform diagram illustrating a fourth example waveform of the angle error occurring in the angle detection value when no correction processing is performed.

FIG. 9 shows the waveform of the angle error in a case where $B_0$ is −0.02 and the first and second detection signals S1 and S2 are expressed in the pair of Eqs. (1) and (2). FIG. 10 shows the waveform of the angle error in a case where $B_0$ is −0.02 and the first and second detection signals S1 and S2 are expressed in the pair of Eqs. (3) and (4).

FIGS. 9 and 10 also show the foregoing first and second characteristics. FIGS. 7 and 9 show the foregoing third characteristic. More specifically, the 4th-order angle error components in FIGS. 7 and 9 have opposite phases. FIGS. 8 and 10 also show the third characteristic. More specifically, the 2nd-order angle error components in FIGS. 8 and 10 have opposite phases.

As seen from the foregoing first characteristic, when each of the first and second detection signals S1 and S2 contains two signal error components of different orders, an Nth-order angle error component can occur in the angle detection value θs if no correction processing is performed. Specifically, the two signal error components of the first detection signal S1 are an (N−1)th-order signal error component corresponding to the signal error component in Eq. (1) and an (N+1)th-order signal error component corresponding to the signal error component in Eq. (3). The two signal error components of the second detection signal S2 are an (N−1)th-order signal error component corresponding to the signal error component in Eq. (2) and an (N+1)th-order signal error component corresponding to the signal error component in Eq. (4). The correction apparatus 3 according to the present embodiment is configured to correct the first and second detection signals S1 and S2 to reduce the Nth-order angle error component in such a case.

Next, the correction processing according to the present embodiment will be described in detail. In the present embodiment, the first detection signal S1 contains the first ideal component expressed as $A_0 \sin \theta$, a first signal error component expressed as $-A_1 \sin((N-1)\theta+\alpha)$, and a second signal error component expressed as $-A_2 \sin((N+1)\theta+\alpha)$, where $A_1$ and $A_2$ are real numbers other than 0. The second detection signal S2 contains the second ideal component expressed as $A_0 \cos \theta$, a third signal error component expressed as $A_1 \cos((N-1)\theta+\alpha)$, and a fourth signal error component expressed as $-A_2 \cos((N+1)\theta+\alpha)$.

The first signal error component and the third signal error component are (N−1)th-order signal error components corresponding to the signal error components in Eqs. (1) and (2). The second signal error component and the fourth signal error component are (N+1)th-order signal error components corresponding to the signal error components in Eqs. (3) and (4).

For simplicity of description below, assume that the first detection signal S1 contains only the first ideal component and first and second signal error components, and the second detection signal S2 contains only the second ideal component and third and fourth signal error components. In such a case, the first and second detection signals S1 and S2 are expressed in Eqs. (5) and (6) below.

$$S1 = A_0 \sin \theta - A_1 \sin((N-1)\theta+\alpha) - A_2 \sin((N+1)\theta+\alpha) \quad (5)$$

$$S2 = A_0 \cos \theta + A_1 \cos((N-1)\theta+\alpha) - A_2 \cos((N+1)\theta+\alpha) \quad (6)$$

If the detection-target angle θ varies with a predetermined period T, the angle detection value θs without the correction processing contains a component resulting from the first to fourth signal error components and varying with a period of T/N, i.e., an Nth-order angle error component.

The present embodiment uses the foregoing first to third characteristics to reduce the N-th order angle error component in the following manner.

Suppose here that the correction processing can determine the first correction value C1 to be $-A_3 \sin((N-1)\theta+\alpha)$ and the second correction value C2 to be $A_3 \cos((N-1)\theta+\alpha)$. In such a case, reduction in amplitude of the Nth-order angle error component is achieved by setting $A_3$ to a real number such that $|A_1+A_2+A_3|$ is less than $|A_1+A_2|$. In actuality, however, it is not possible to determine the first and second correction values C1 and C2 as above since the detection-target angle θ is unknown to the correction processor 33.

To address this problem, in the correction processing according to the present embodiment, the correction value generator 36 uses an uncorrected angle detection value θp instead of the detection-target angle θ to determine the first and second correction values C1 and C2 expressed in Eqs. (7) and (8) below. The uncorrected angle detection value θp is an angle detection value without the correction processing. $A_3$ is a real number such that $|A_1+A_2+A_3|$ is less than $|A_1+A_2|$. $|A_1+A_2+A_3|$ is preferably less than or equal to $|A_1+A_2|\times 0.5$. More preferably, $|A_1+A_2+A_3|$ is 0.

$$C1 = -A_3 \sin((N-1)\theta p+\alpha) \quad (7)$$

$$C2 = A_3 \cos((N-1)\theta p+\alpha) \quad (8)$$

If the first and second correction values C1 and C2 have a period of T/D when the detection-target angle θ varies with a period T, we say that the order of each of the first and second correction values C1 and C2 is D. In the present embodiment, specifically, the order of each of the first and second correction values C1 and C2 is N−1.

The correction information storage unit 37 stores the respective values of N, $A_3$ and α as the correction information, and supplies the values to the correction value generator 36. The correction value generator 36 uses the values of N, $A_3$ and α to determine the first and second correction values C1 and C2 expressed in Eqs. (7) and (8).

The correction value generator 36 may compute the uncorrected angle detection value θp in accordance with Eq. (9) below, using the first and second detection signals S1 and S2. The correction value generator 36 may then determine the first and second correction values C1 and C2 by substituting the values of N, $A_3$, and α supplied as correction information and the computed uncorrected angle detection value θp into Eqs. (7) and (8).

$$\theta p = \operatorname{atan}(S1/S2) \quad (9)$$

In Eq. (9) "atan" represents an arctangent.

For θp ranging from 0° to less than 360°, Eq. (9) yields two solutions of θp that are 180° different in value. Which of the two solutions of θp in Eq. (9) is the true value of θp can be determined in accordance with the combination of the signs of S1 and S2. The correction value generator 36 determines θp within the range of 0° to less than 360° in accordance with Eq. (9) and the determination on the combination of the signs of S1 and S2.

In some cases, the correction value generator 36 can determine the first and second correction values C1 and C2 without computing the uncorrected angle detection value θp. For example, if N is 1, then $(N-1)\theta p$ in Eqs. (7) and (8) makes 0. In this case, both the first and second correction values C1 and C2 are constant values that do not vary with the uncorrected angle detection value θp.

If N is 2, then $(N-1)\theta p$ in Eqs. (7) and (8) makes θp. In this case, Eqs. (7) and (8) can be modified to express C1 and C2 with sin θp and cos θp as variables. Here, sin θp and cos θp respectively represent the values of the first detection signal S1 and the second detection signal S2 normalized so that the amplitude is 1. In this case, the first and second correction values C1 and C2 can be determined based on the first and second detection signals S1 and S2 without computing the uncorrected angle detection value θp.

Even if N is 3 or more, Eqs. (7) and (8) can sometimes be modified to express C1 and C2 with sin θp and cos θp as variables. In such cases, the first and second correction values C1 and C2 can be determined based on the first and second detection signals S1 and S2 without computing the uncorrected angle detection value θp.

The correction value generator 36 supplies the first correction value C1 to the adder 34, and the second correction value C2 to the adder 35. The adder 34 adds the first correction value C1 to the first detection signal S1 to generate the first corrected detection signal S1c. The adder 35 adds the second correction value C2 to the second detection signal S2 to generate the second corrected detection signal S2c. The first and second corrected detection signals S1c and S2c are expressed in Eqs. (10) and (11) below, respectively.

$$\begin{aligned}S1c &= S1 + C1 \\ &= A_0 \sin\theta - A_1 \sin((N-1)\theta + \alpha) - \\ &\quad A_2 \sin((N+1)\theta + \alpha) - \\ &\quad A_3 \sin((N-1)\theta p + \alpha)\end{aligned} \quad (10)$$

$$\begin{aligned}S2c &= S2 + C2 \\ &= A_0 \cos\theta + A_1 \cos((N-1)\theta + \alpha) - \\ &\quad A_2 \cos((N+1)\theta + \alpha) + \\ &\quad A_3 \cos((N-1)\theta p + \alpha)\end{aligned} \quad (11)$$

The first and second corrected detection signals S1c and S2c are supplied to the angle detector 4 shown in FIG. 3. The angle detector 4 uses the first and second corrected detection signals S1c and S2c to generate the angle detection value θs in accordance with Eq. (12) below.

$$\theta s = \operatorname{atan}(S1c/S2c) \quad (12)$$

For θs ranging from 0° to less than 360°, Eq. (12) yields two solutions of θs that are 180° different in value. Which of the two solutions of θs in Eq. (12) is the true value of θs can be determined in accordance with the combination of the signs of S1c and S2c. The angle detector 4 determines θs within the range of 0° to less than 360° in accordance with Eq. (12) and the determination on the combination of the signs of S1c and S2c.

Figure 11:
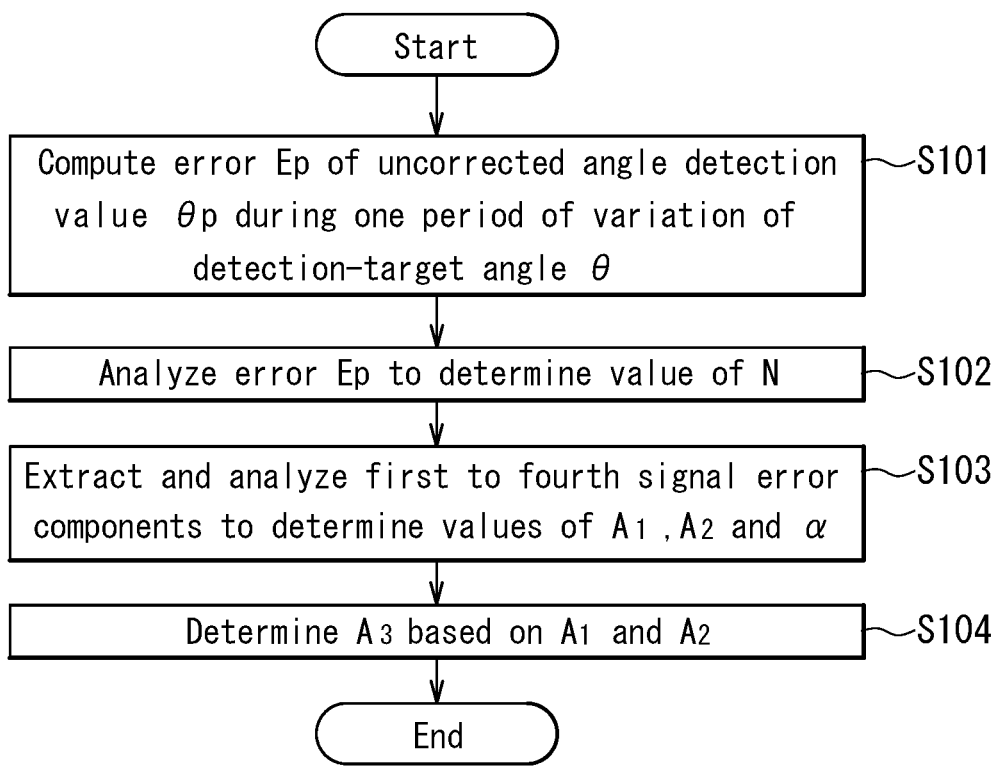
FIG. 11 is a flowchart of a correction information determination procedure in the first embodiment of the invention.

The correction information to be stored in the correction information storage unit 37 is determined using a control unit (not shown) outside the angle sensor 1 and supplied to the correction information storage unit 37 before shipment or use of the angle sensor 1. This procedure will be referred to as correction information determination procedure. The correction information determination procedure will now be described with reference to FIG. 11. FIG. 11 is a flowchart of the correction information determination procedure.

The correction information determination procedure is performed before shipment or use of the angle sensor 1. The correction information determination procedure is performed in a situation where the control unit can recognize the detection-target angle θ. Examples of such a situation include when the detection-target angle θ is changed at the command of the control unit and when the control unit can obtain information on the detection-target angle θ.

The correction information determination procedure starts with step S101 where the first and second detection signals S1 and S2 converted into digital form by the A/D converters 31 and 32 are obtained during one period of variation of the detection-target angle θ. Further, in step S101, the uncorrected angle detection value θp is computed in accordance with the foregoing Eq. (9) and an error Ep of the uncorrected angle detection value θp is computed in accordance with the following Eq. (13) during one period of variation of the detection-target angle θ.

$$Ep = \theta p - \theta \quad (13)$$

The correction information determination procedure then continues to step S102 where the error Ep computed during the one period of variation of the detection-target angle θ is analyzed to extract a component that is a principle component of the error Ep and varies with a period of 1/N the period T of the detection-target angle θ, and the value of N corresponding to such a component is determined as the value of N serving as the correction information. The analysis of the error Ep is performed using Fourier analysis, for example.

The correction information determination procedure then continues to step S103 where the first and second detection signals S1 and S2 obtained during the one period of variation of the detection-target angle θ are analyzed to extract the first to fourth signal error components corresponding to the value of N determined in step S102. The analysis of the first and second detection signals S1 and S2 is performed using Fourier analysis, for example. Further, in step S103, the extracted first to fourth signal error components are also analyzed to determine the values of $A_1$, $A_2$, and α. The value of α determined in step S103 is the value of a serving as the correction information.

The correction information determination procedure then continues to step S104 where $A_3$ is determined based on $A_1$ and $A_2$ determined in step S103. $A_3$ is determined so that $|A_1+A_2+A_3|$ is less than $|A_1+A_2|$. The correction information determination procedure then ends. $A_3$ is preferably determined so that $|A_1+A_2+A_3|$ is less than or equal to $|A_1+A_2| \times 0.5$, more preferably, $|A_1+A_2+A_3|$ is 0.

If $|A_1+A_2+A_3|$ is less than $|A_1+A_2|$, it is possible to achieve a reduction in amplitude of the Nth-order angle error component as compared to when no correction processing is performed. If $|A_1+A_2+A_3|$ is less than or equal to $|A_1+A_2| \times 0.5$, it is possible to reduce the amplitude of the Nth-order angle error component to approximately one half that in the case where no correction processing is performed. If $|A_1+A_2+A_3|$ is 0, it is possible to make the amplitude of the Nth-order angle error component almost zero.

As described above, the correction apparatus 3 and the angle sensor 1 according to the present embodiment are capable of reducing the Nth-order angle error component as compared to when no correction processing is performed. The applicability of the correction processing according to the present embodiment does not depend on the value of N, provided that N is an integer greater than or equal to 1.

In the present embodiment, each of the first and second detection signals S1 and S2 contains two signal error components of the (N−1)th and (N+1)th orders. A typical method for reducing the angle error in such a case is to add to the first detection signal S1 such a first correction value as to cancel out the two signal error components of the first detection signal S1 and add to the second detection signal S2 such a second correction value as to cancel out the two signal error components of the second detection signal S2. However, the first and second correction values used in such a method each contain two components having their respective periods. This makes the first and second correction values complicated, and consequently complicates the processing for reducing the Nth-order angle error component.

In contrast, in the present embodiment, each of the first and second correction values C1 and C2 contains only an (N−1)th-order component even though each of the first and second detection signals S1 and S2 contains two signal error components of the (N−1)th and (N+1)th orders. Thus, in the present embodiment the first and second correction values C1 and C2 are simplified and the correction processing is simplified as well.

Consequently, according to the present embodiment, an Nth-order angle error component that results when each of the first and second detection signals S1 and S2 contains two signal error components of different orders is reduced with simple processing regardless of the value of N.

Examples 1 to 5 of the present embodiment will now be described. In the following description, the angle error, i.e., an error of the angle detection value θs in the present embodiment, will be denoted by the symbol Es. The angle error Es is expressed in Eq. (14) below.

$$Es=\theta s-\theta \quad (14)$$

Example 1

Example 1 deals with a case where N is 1. If N is 1, Eqs. (7) and (8) yield the following Eqs. (15) and (16).

$$C1=-A_3 \sin \alpha \quad (15)$$

$$C2=A_3 \cos \alpha \quad (16)$$

As can be seen from Eqs. (15) and (16), if N is 1, both the first and second correction values C1 and C2 are constant values that do not vary with the uncorrected angle detection value θp. If N is 1, the (N−1)th-order signal error components of the detection signals S1 and S2 have constant values that do not vary with the detection-target angle θ. The periods of the (N−1)th-order signal error components and correction values C1 and C2 where N=1 can be said to be infinite.

If N is 1, Eqs. (10) and (11) yield the following Eqs. (17) and (18).

$$S1c=A_0 \sin \theta -A_1 \sin \alpha -A_2 \sin(2\theta+\alpha)-A_3 \sin \alpha \quad (17)$$

$$S2c=A_0 \cos \theta +A_1 \cos \alpha -A_2 \cos(2\theta+\alpha)+A_3 \cos \alpha \quad (18)$$

Now, specific examples of the cases where $A_0=1$, $A_1=0.01$, $A_2=0.01$ and $\alpha=30°$ will be described with reference to FIG. 12 to FIG. 14.

Figure 12:
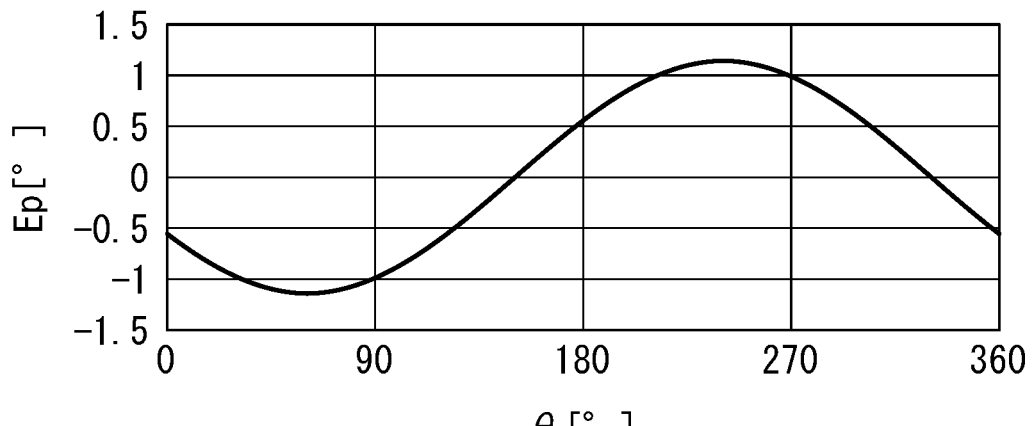
FIG. 12 is a waveform diagram illustrating an example waveform of an error of an uncorrected angle detection value in Example 1 of the first embodiment of the invention.

FIG. 12 is a waveform diagram illustrating the waveform of the error Ep of the uncorrected angle detection value θp. In FIG. 12, the horizontal axis represents the detection-target angle θ, and the vertical axis represents the error Ep.

Figure 13:
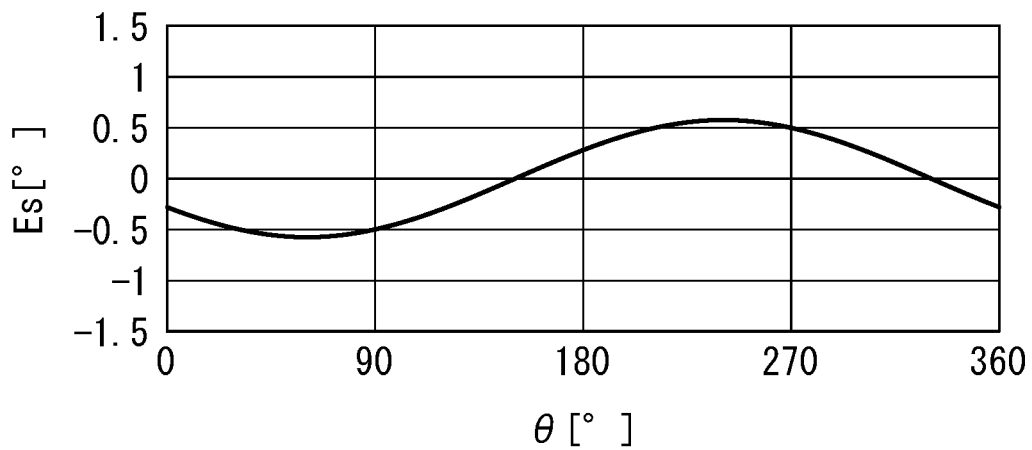
FIG. 13 is a waveform diagram illustrating a first example waveform of the angle error in Example 1 of the first embodiment of the invention.

FIG. 13 is a waveform diagram illustrating the waveform of the angle error Es when $A_3$ is −0.01. In FIG. 13, the horizontal axis represents the detection-target angle θ, and the vertical axis represents the angle error Es. If $A_3$ is −0.01, then $|A_1+A_2+A_3|$ is equal to $|A_1+A_2|\times 0.5$. In this case, the maximum absolute value of the angle error Es is approximately one half that of the error Ep shown in FIG. 12.

Figure 14:
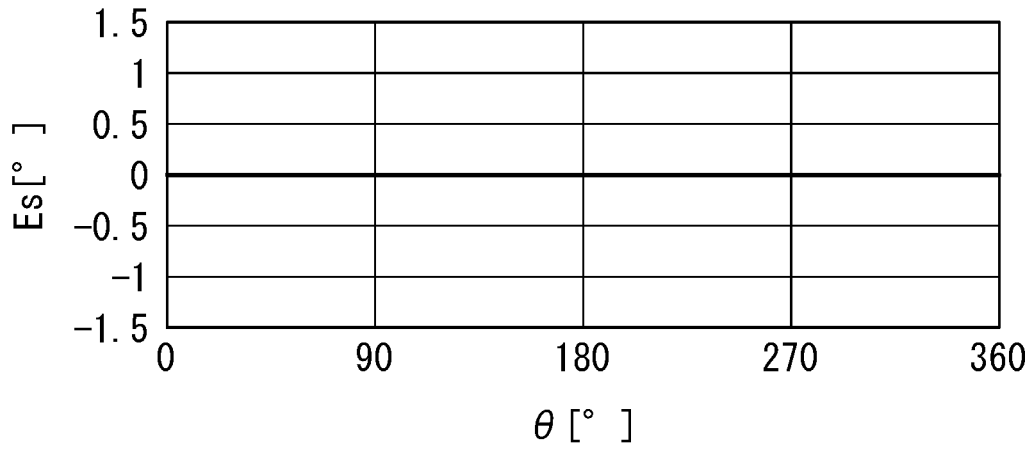
FIG. 14 is a waveform diagram illustrating a second example waveform of the angle error in Example 1 of the first embodiment of the invention.

FIG. 14 is a waveform diagram illustrating the waveform of the angle error Es when $A_3$ is −0.02. In FIG. 14, the horizontal axis represents the detection-target angle θ, and the vertical axis represents the angle error Es. If $A_3$ is −0.02, then $|A_1+A_2+A_3|$ is 0. In this case, the absolute value of the angle error Es is 0 regardless of θ.

Example 2

Example 2 deals with a case where N is 2. If N is 2, Eqs. (7) and (8) yield the following Eqs. (19) and (20).

$$C1=-A_3 \sin(\theta p+\alpha) \quad (19)$$

$$C2=A_3 \cos(\theta p+\alpha) \quad (20)$$

As can be seen from Eqs. (19) and (20), if N is 2, both the first and second correction values C1 and C2 vary with the uncorrected angle detection value θp.

If N is 2, Eqs. (10) and (11) yield the following Eqs. (21) and (22).

$$S1c=A_0 \sin \theta -A_1 \sin(\theta+\alpha)-A_2 \sin(3\theta+\alpha)-A_3 \sin(\theta p+\alpha) \quad (21)$$

$$S2c=A_0 \cos \theta +A_1 \cos(\theta+\alpha)-A_2 \cos(3\theta+\alpha)+A_3 \cos(\theta p+\alpha) \quad (22)$$

As described above, if N is 2, Eqs. (19) and (20) can be modified to express C1 and C2 with sin θp and cos θp as variables. Modifying Eqs. (19) and (20) yields Eqs. (23) and (24) below. In such a case, as mentioned above, the first and second correction values C1 and C2 can be determined based on the first and second detection signals S1 and S2 without computing the uncorrected angle detection value θp.

$$C1=A_3\{\sin \theta p \cdot \cos \alpha +\cos \theta p \cdot \sin \alpha\} \quad (23)$$

$$C2=A_3\{\cos \theta p \cdot \cos \alpha -\sin \theta p \cdot \sin \alpha\} \quad (24)$$

Now, specific examples of the cases where $A_0=1$, $A_1=0.01$, $A_2=0.01$ and $\alpha=30°$ will be described with reference to FIG. 15 to FIG. 17.

Figure 15:
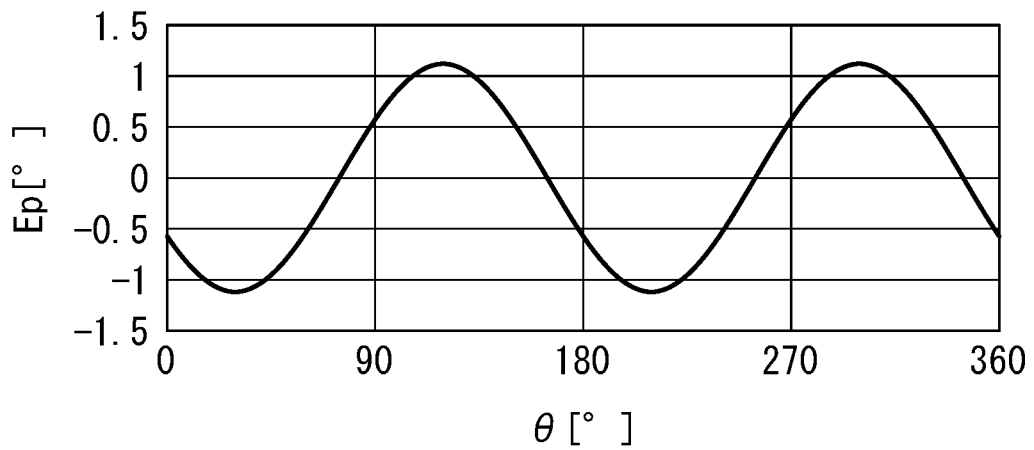
FIG. 15 is a waveform diagram illustrating an example waveform of an error in the uncorrected angle detection value in Example 2 of the first embodiment of the invention.

FIG. 15 is a waveform diagram illustrating the waveform of the error Ep of the uncorrected angle detection value θp. In FIG. 15, the horizontal axis represents the detection-target angle θ, and the vertical axis represents the error Ep.

Figure 16:
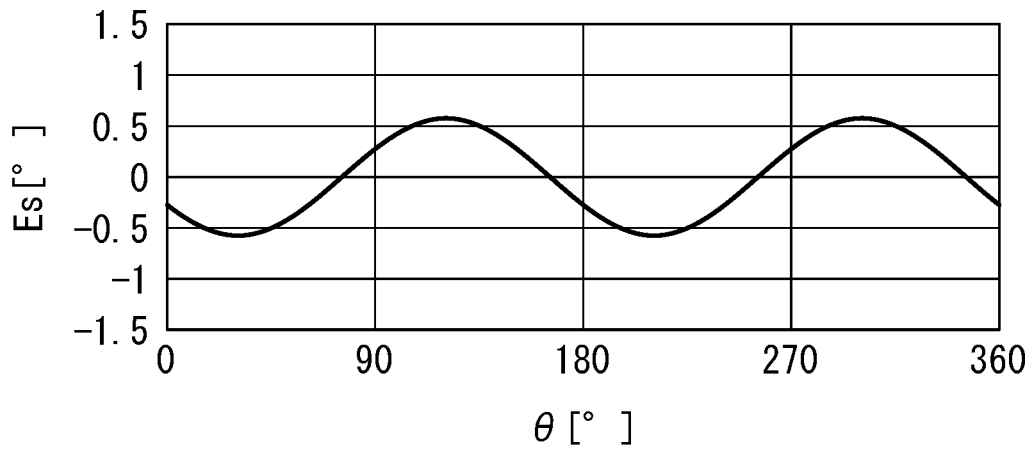
FIG. 16 is a waveform diagram illustrating a first example waveform of the angle error in Example 2 of the first embodiment of the invention.

FIG. 16 is a waveform diagram illustrating the waveform of the angle error Es when $A_3$ is −0.01. In FIG. 16, the horizontal axis represents the detection-target angle θ, and the vertical axis represents the angle error Es. If $A_3$ is −0.01, then $|A_1+A_2+A_3|$ is equal to $|A_1+A_2|\times 0.5$. In this case, the maximum absolute value of the angle error Es is approximately one half that of the error Ep shown in FIG. 15.

Figure 17:
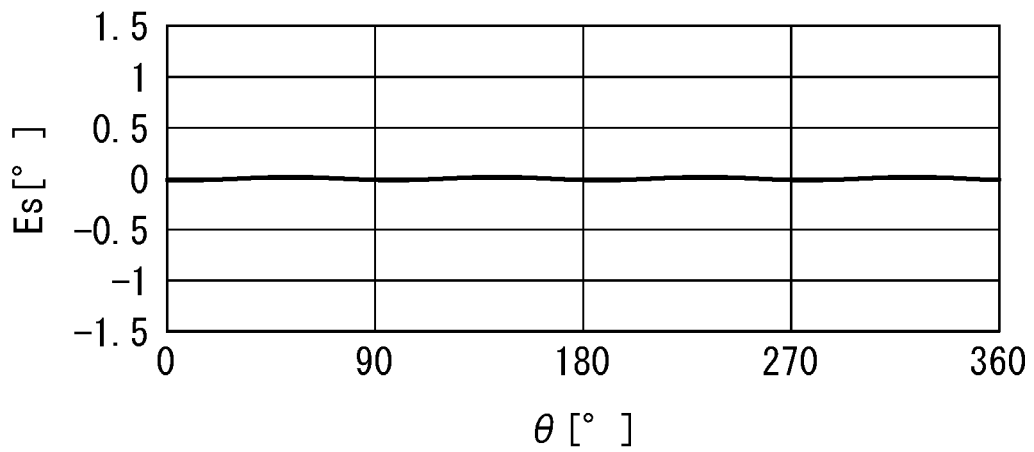
FIG. 17 is a waveform diagram illustrating a second example waveform of the angle error in Example 2 of the first embodiment of the invention.

FIG. 17 is a waveform diagram illustrating the waveform of the angle error Es when $A_3$ is −0.02. In FIG. 17, the horizontal axis represents the detection-target angle θ, and the vertical axis represents the angle error Es. If $A_3$ is 0.02, then $|A_1+A_2+A_3|$ is 0. In this case, the maximum absolute value of the angle error Es is much smaller than that of the error Ep shown in FIG. 15.

Example 3

Example 3 deals with a case where N is 3. Now, specific examples of the cases where $A_0=1$, $A_1=0.01$, $A_2=0.01$, and $\alpha=30°$ will be described with reference to FIG. 18 to FIG. 20.

Figure 18:
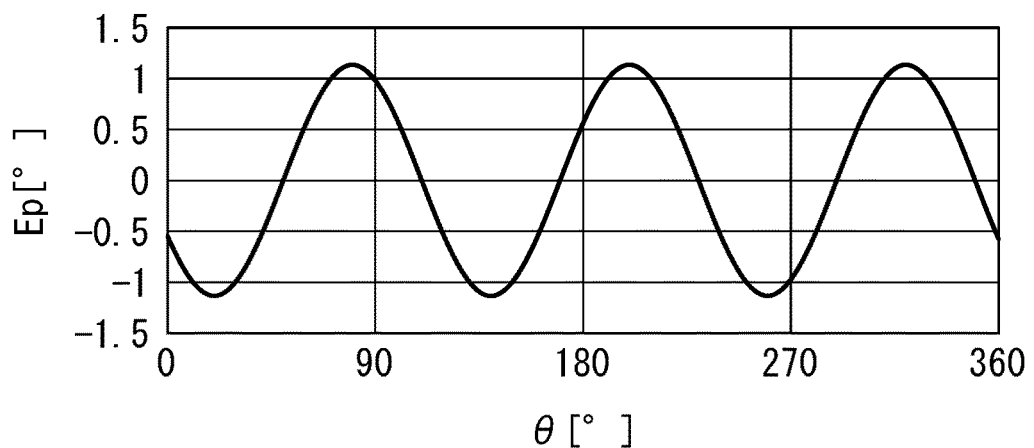
FIG. 18 is a waveform diagram illustrating an example waveform of an error in the uncorrected angle detection value in Example 3 of the first embodiment of the invention.

FIG. 18 is a waveform diagram illustrating the waveform of the error Ep of the uncorrected angle detection value θp. In FIG. 18, the horizontal axis represents the detection-target angle θ, and the vertical axis represents the error Ep.

Figure 19:
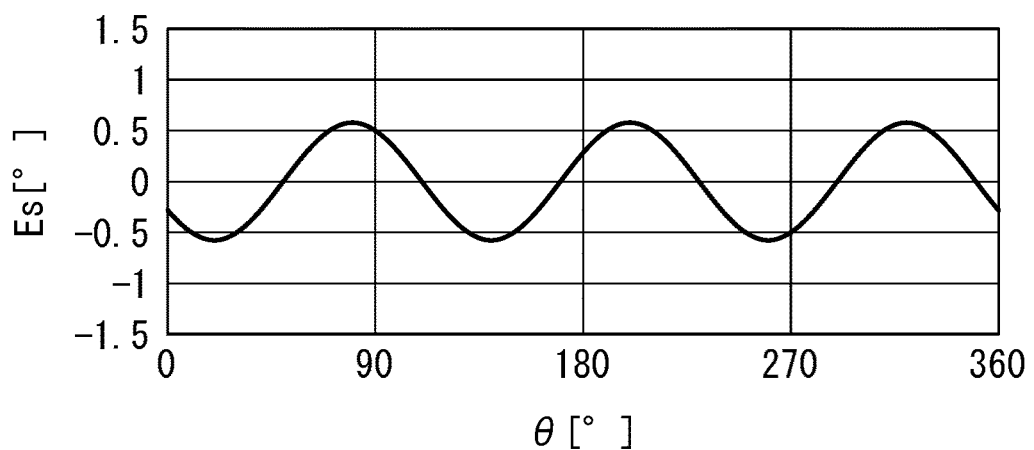
FIG. 19 is a waveform diagram illustrating a first example waveform of the angle error in Example 3 of the first embodiment of the invention.

FIG. 19 is a waveform diagram illustrating the waveform of the angle error Es when $A_3$ is −0.01. In FIG. 19, the horizontal axis represents the detection-target angle θ, and the vertical axis represents the angle error Es. If $A_3$ is −0.01, then $|A_1+A_2+A_3|$ is equal to $|A_1+A_2|\times 0.5$. In this case, the maximum absolute value of the angle error Es is approximately one half that of the error Ep shown in FIG. 18.

Figure 20:
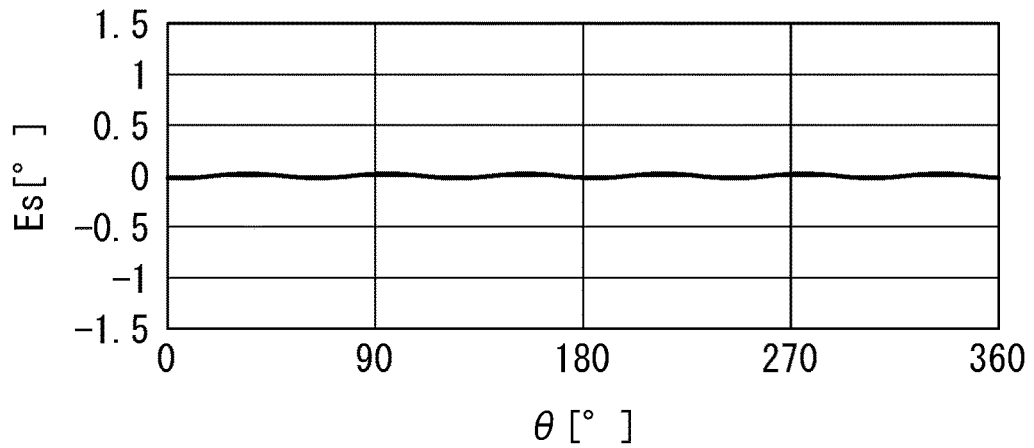
FIG. 20 is a waveform diagram illustrating a second example waveform of the angle error in Example 3 of the first embodiment of the invention.

FIG. 20 is a waveform diagram illustrating the waveform of the angle error Es when $A_3$ is −0.02. In FIG. 20, the horizontal axis represents the detection-target angle θ, and the vertical axis represents the angle error Es. If $A_3$ is −0.02, then $|A_1+A_2+A_3|$ is 0. In this case, the maximum absolute value of the angle error Es is much smaller than that of the error Ep shown in FIG. 18.

Example 4

Example 4 deals with a case where N is 4. Now, specific examples of the cases where $A_0=1$, $A_1=0.01$, $A_2=0.01$, and $\alpha=30°$ will be described with reference to FIG. 21 to FIG. 23.

Figure 21:
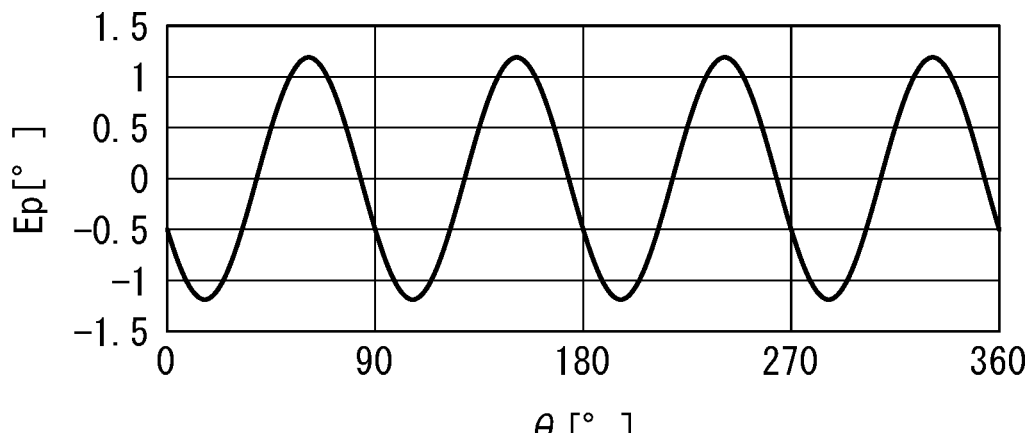
FIG. 21 is a waveform diagram illustrating an example waveform of an error in the uncorrected angle detection value in Example 4 of the first embodiment of the invention.

FIG. 21 is a waveform diagram illustrating the waveform of the error Ep of the uncorrected angle detection value θp. In FIG. 21, the horizontal axis represents the detection-target angle θ, and the vertical axis represents the error Ep.

Figure 22:
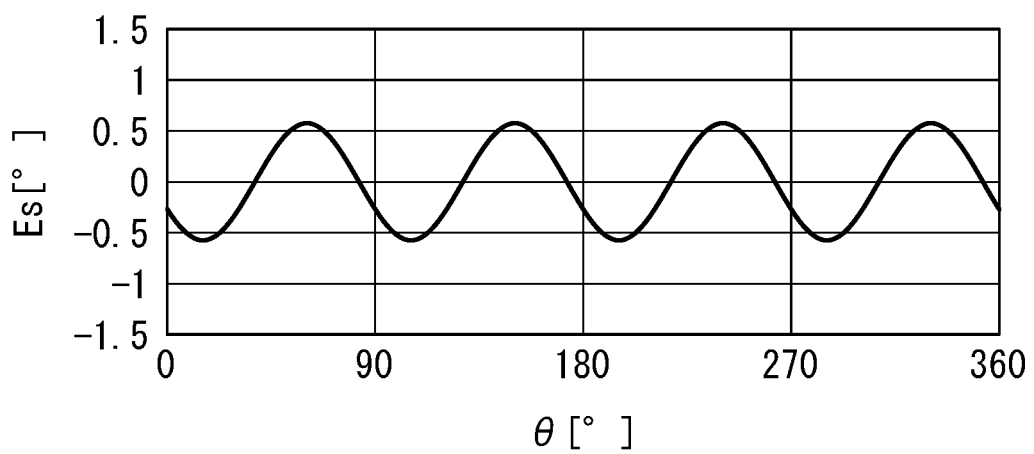
FIG. 22 is a waveform diagram illustrating a first example waveform of the angle error in Example 4 of the first embodiment of the invention.

FIG. 22 is a waveform diagram illustrating the waveform of the angle error Es when $A_3$ is −0.01. In FIG. 22, the horizontal axis represents the detection-target angle θ, and the vertical axis represents the angle error Es. If $A_3$ is −0.01, then $|A_1+A_2+A_3|$ is equal to $|A_1+A_2|\times 0.5$. In this case, the maximum absolute value of the angle error Es is approximately one half that of the error Ep shown in FIG. 21.

Figure 23:
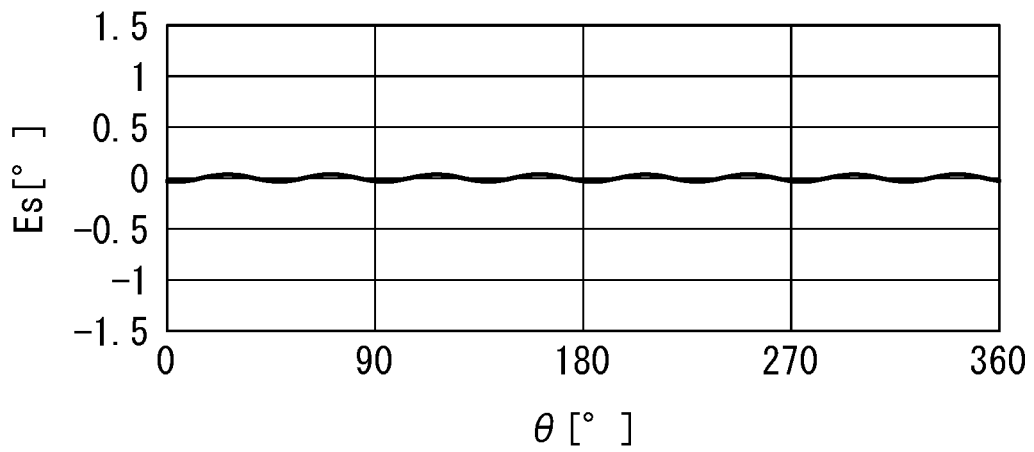
FIG. 23 is a waveform diagram illustrating a second example waveform of the angle error in Example 4 of the first embodiment of the invention.

FIG. 23 is a waveform diagram illustrating the waveform of the angle error Es when $A_3$ is −0.02. In FIG. 23, the horizontal axis represents the detection-target angle θ, and the vertical axis represents the angle error Es. If $A_3$ is −0.02, then $|A_1+A_2+A_3|$ is 0. In this case, the maximum absolute value of the angle error Es is much smaller than that of the error Ep shown in FIG. 21.

Example 5

Example 5 deals with a case where N is 5. Now, specific examples of the cases where $A_0=1$, $A_1=0.01$, $A_2=0.01$, and $\alpha=30°$ will be described with reference to FIG. 24 to FIG. 26.

Figure 24:
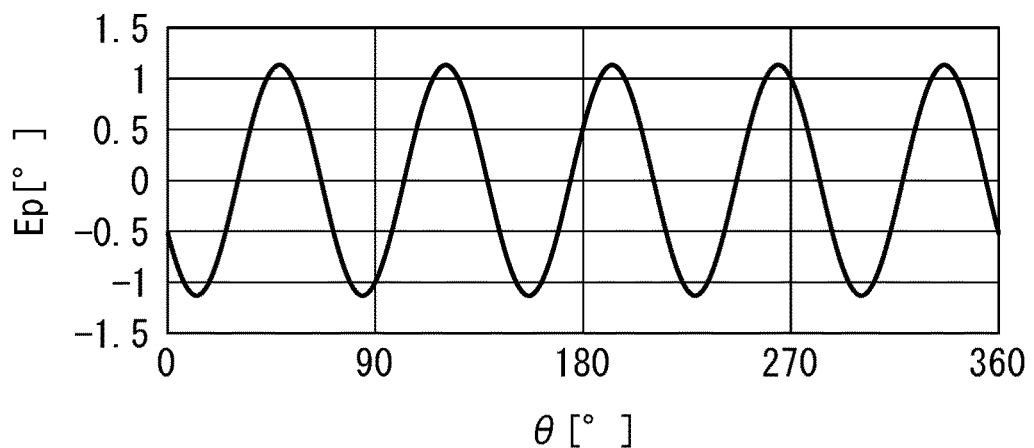
FIG. 24 is a waveform diagram illustrating an example waveform of an error in the uncorrected angle detection value in Example 5 of the first embodiment of the invention.

FIG. 24 is a waveform diagram illustrating the waveform of the error Ep of the uncorrected angle detection value θp. In FIG. 24, the horizontal axis represents the detection-target angle θ, and the vertical axis represents the error Ep.

Figure 25:
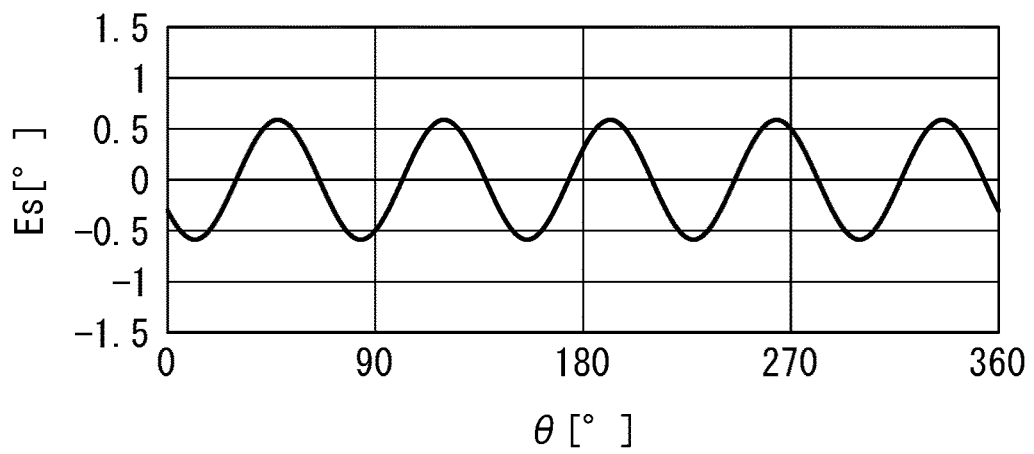
FIG. 25 is a waveform diagram illustrating a first example waveform of the angle error in Example 5 of the first embodiment of the invention.

FIG. 25 is a waveform diagram illustrating the waveform of the angle error Es when $A_3$ is −0.01. In FIG. 25, the horizontal axis represents the detection-target angle θ, and the vertical axis represents the angle error Es. If $A_3$ is −0.01, then $|A_1+A_2+A_3|$ is equal to $|A_1+A_2|\times 0.5$. In this case, the maximum absolute value of the angle error Es is approximately one half that of the error Ep shown in FIG. 24.

Figure 26:
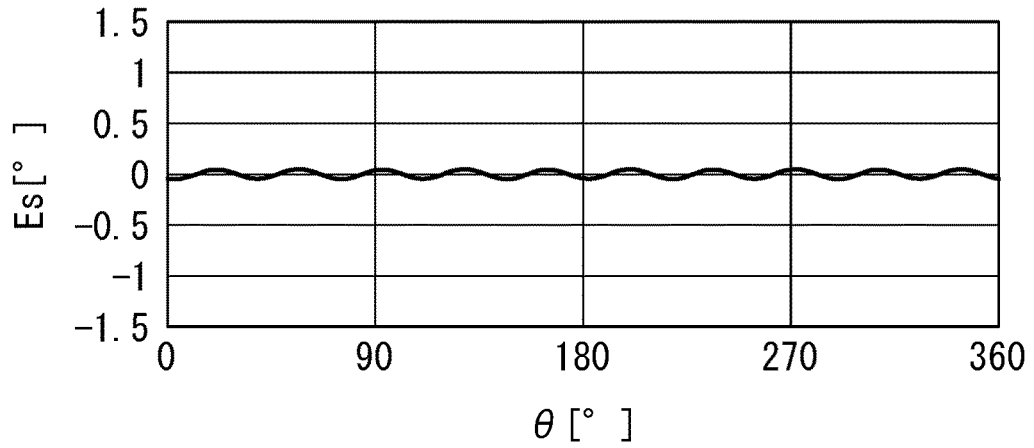
FIG. 26 is a waveform diagram illustrating a second example waveform of the angle error in Example 5 of the first embodiment of the invention.

FIG. 26 is a waveform diagram illustrating the waveform of the angle error Es when $A_3$ is −0.02. In FIG. 26, the horizontal axis represents the detection-target angle θ, and the vertical axis represents the angle error Es. If $A_3$ is −0.02, then $|A_1+A_2+A_3|$ is 0. In this case, the maximum absolute value of the angle error Es is much smaller than that of the error Ep shown in FIG. 24.

No specific examples are shown here for the cases where N is 6 or more. However, also in the cases where N is 6 or more, the present embodiment provides the same effects as those in the cases where N is 5 or less.

Second Embodiment

Figure 27:
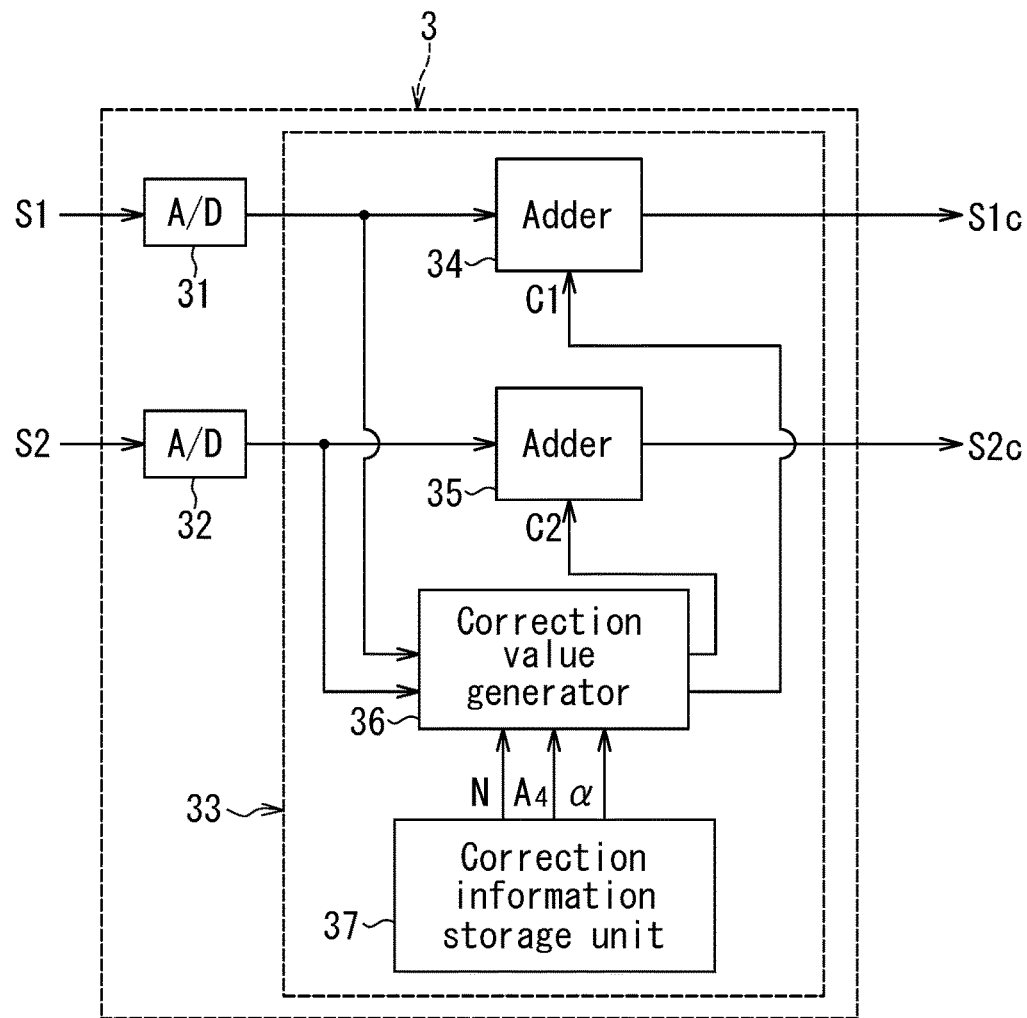
FIG. 27 is a functional block diagram illustrating the configuration of a correction apparatus according to a second embodiment of the invention.

A second embodiment of the invention will now be described. FIG. 27 is a block diagram illustrating the configuration of a correction apparatus 3 according to the second embodiment. The second embodiment differs from the first embodiment in the following ways.

In the correction processing according to the present embodiment, the correction value generator 36 determines the first and second correction values C1 and C2 expressed in Eqs. (25) and (26) below, instead of Eqs. (7) and (8). $A_4$ is a real number such that $|A_1+A_2+A_4|$ is less than $|A_1+A_2|$. $|A_1+A_2+A_4|$ is preferably less than or equal to $|A_1+A_2|\times 0.5$. More preferably, $|A_1+A_2+A_4|$ is 0. In the present embodiment, the order of each of the first and second correction values C1 and C2 is N+1.

$$C1 = -A_4 \sin((N+1)\theta p + \alpha) \tag{25}$$

$$C2 = -A_4 \cos((N+1)\theta p + \alpha) \tag{26}$$

The correction information storage unit 37 stores the respective values of N, $A_4$ and α as the correction information, and supplies the values to the correction value generator 36. The correction value generator 36 uses the values of N, $A_4$ and α to determine the first and second correction values C1 and C2 expressed in Eqs. (25) and (26).

In the present embodiment, the first and second corrected detection signals S1c and S2c are expressed in Eqs. (27) and (28) below, respectively.

$$\begin{aligned}S1c &= S1 + C1 \\ &= A_0 \sin\theta - A_1 \sin((N-1)\theta + \alpha) - \\ &\quad A_2 \sin((N+1)\theta + \alpha) - \\ &\quad A_4 \sin((N+1)\theta p + \alpha)\end{aligned} \tag{27}$$

$$\begin{aligned}S2c &= S2 + C2 \\ &= A_0 \cos\theta + A_1 \cos((N-1)\theta + \alpha) - \\ &\quad A_2 \cos((N+1)\theta + \alpha) - \\ &\quad A_4 \cos((N+1)\theta p + \alpha)\end{aligned} \tag{28}$$

According to the correction information determination procedure of the present embodiment, in step S104 shown in FIG. 11, $A_4$ is determined instead of $A_3$, based on $A_1$ and $A_2$. $A_4$ is determined so that $|A_1+A_2+A_4|$ is less than $|A_1+A_2|$. $A_4$ is preferably determined so that $|A_1+A_2+A_4|$ is less than or equal to $|A_1+A_2|\times 0.5$, more preferably, $|A_1+A_2+A_4|$ is 0.

In the present embodiment, the first to third characteristics described in relation to the first embodiment indicate the following. If $|A_1+A_2+A_4|$ is less than $|A_1+A_2|$, it is possible to achieve a reduction in amplitude of the Nth-order angle error component as compared to when no correction processing is performed. If $|A_1+A_2+A_4|$ is less than or equal to $|A_1+A_2|\times0.5$, it is possible to reduce the amplitude of the Nth-order angle error component to approximately one half that in the case where no correction processing is performed. If $|A_1+A_2+A_4|$ is 0, it is possible to make the amplitude of the Nth-order angle error component almost zero.

In the present embodiment, each of the first and second correction values C1 and C2 contains only an (N+1)th-order component even though each of the first and second detection signals S1 and S2 contains two signal error components of the (N−1)th and (N+1)th orders. Thus, in the present embodiment the first and second correction values C1 and C2 are simplified and the correction processing is simplified as well, as in the first embodiment.

Examples 1 to 5 of the present embodiment will now be described.

Example 1

Example 1 deals with a case where N is 1. Now, specific examples of the cases where $A_0=1$, $A_1=0.01$, $A_2=0.01$, and $\alpha=30°$ will be described with reference to FIG. 12, FIG. 28 and FIG. 29. The waveform of the error Ep of the uncorrected angle detection value θp in this case is as illustrated in FIG. 12.

Figure 28:
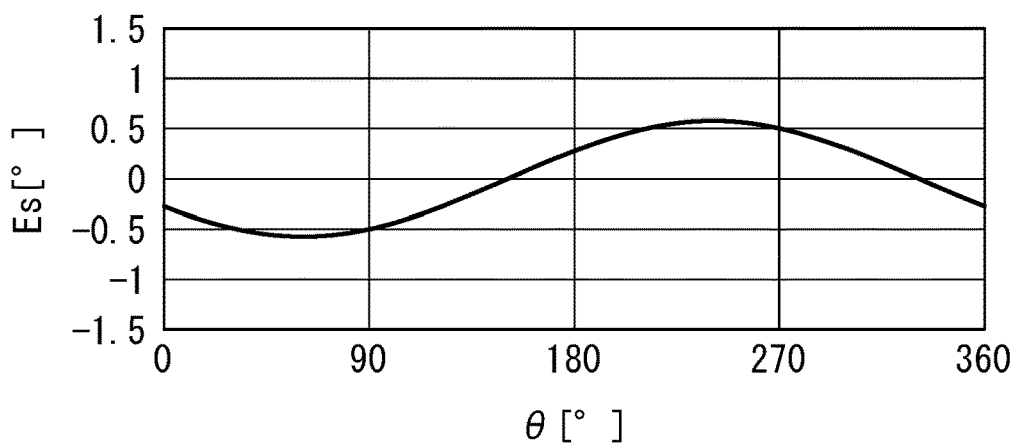
FIG. 28 is a waveform diagram illustrating a first example waveform of the angle error in Example 1 of the second embodiment of the invention.

FIG. 28 is a waveform diagram illustrating the waveform of the angle error Es when $A_4$ is −0.01. In FIG. 28, the horizontal axis represents the detection-target angle θ, and the vertical axis represents the angle error Es. If $A_4$ is −0.01, then $|A_1+A_2+A_4|$ is equal to $|A_1+A_2|\times0.5$. In this case, the maximum absolute value of the angle error Es is approximately one half that of the error Ep shown in FIG. 12.

Figure 29:
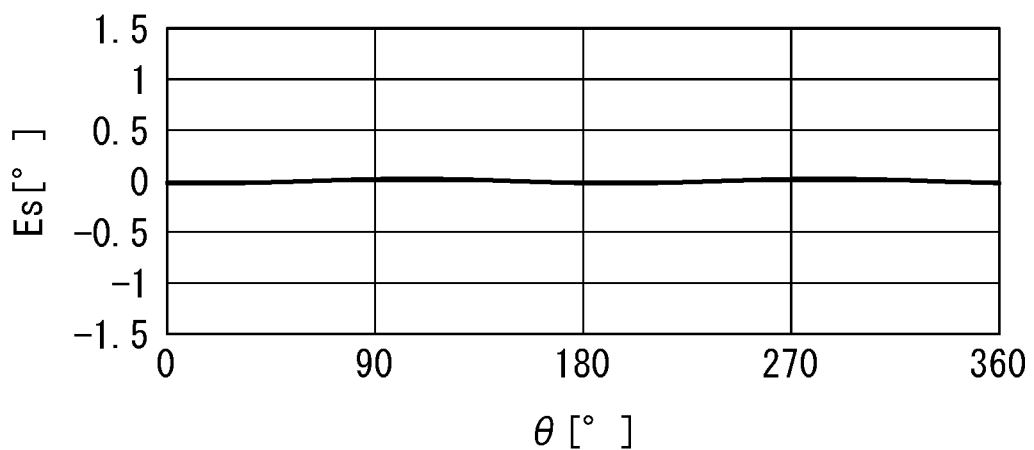
FIG. 29 is a waveform diagram illustrating a second example waveform of the angle error in Example 1 of the second embodiment of the invention.

FIG. 29 is a waveform diagram illustrating the waveform of the angle error Es when $A_4$ is −0.02. In FIG. 29, the horizontal axis represents the detection-target angle θ, and the vertical axis represents the angle error Es. If $A_4$ is −0.02, then $|A_1+A_2+A_4|$ is 0. In this case, the maximum absolute value of the angle error Es is much smaller than that of the error Ep shown in FIG. 12.

Example 2

Example 2 deals with a case where N is 2. Now, specific examples of the cases where $A_0=1$, $A_1=0.01$, $A_2=0.01$, and $\alpha=30°$ will be described with reference to FIG. 15, FIG. 30 and FIG. 31. The waveform of the error Ep of the uncorrected angle detection value θp in this case is as illustrated in FIG. 15.

Figure 30:
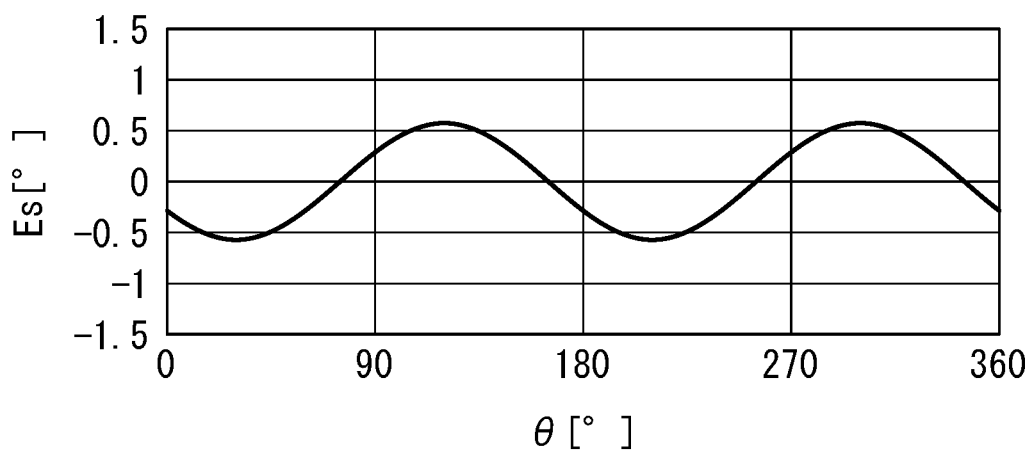
FIG. 30 is a waveform diagram illustrating a first example waveform of the angle error in Example 2 of the second embodiment of the invention.

FIG. 30 is a waveform diagram illustrating the waveform of the angle error Es when $A_4$ is −0.01. In FIG. 30, the horizontal axis represents the detection-target angle θ, and the vertical axis represents the angle error Es. If $A_4$ is −0.01, then $|A_1+A_2+A_4|$ is equal to $|A_1+A_2|\times0.5$. In this case, the maximum absolute value of the angle error Es is approximately one half that of the error Ep shown in FIG. 15.

Figure 31:
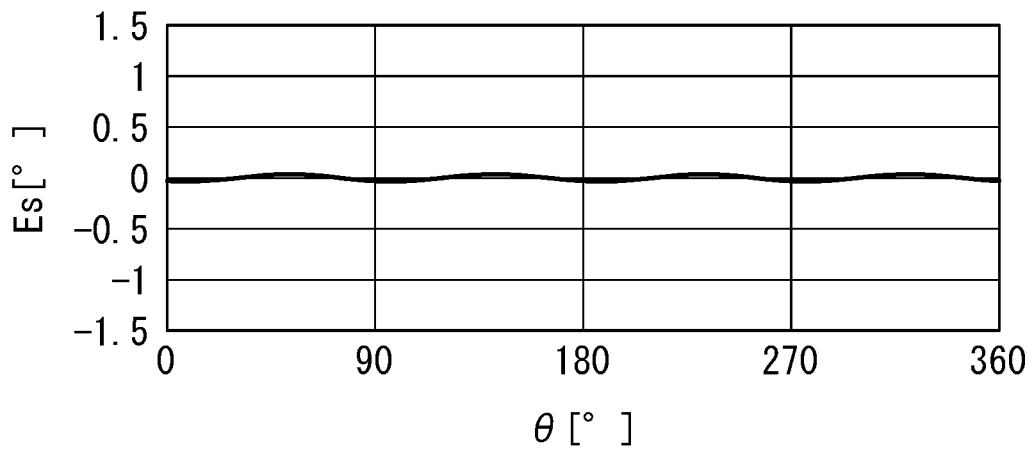
FIG. 31 is a waveform diagram illustrating a second example waveform of the angle error in Example 2 of the second embodiment of the invention.

FIG. 31 is a waveform diagram illustrating the waveform of the angle error Es when $A_4$ is −0.02. In FIG. 31, the horizontal axis represents the detection-target angle θ, and the vertical axis represents the angle error Es. If $A_4$ is −0.02, then $|A_1+A_2+A_4|$ is 0. In this case, the maximum absolute value of the angle error Es is much smaller than that of error Ep shown in FIG. 15.

Example 3

Example 3 deals with a case where N is 3. Now, specific examples of the cases where $A_0=1$, $A_1=0.01$, $A_2=0.01$, and $\alpha=30°$ will be described with reference to FIG. 18, FIG. 32 and FIG. 33. The waveform of the error Ep of the uncorrected angle detection value θp in this case is as illustrated in FIG. 18.

Figure 32:
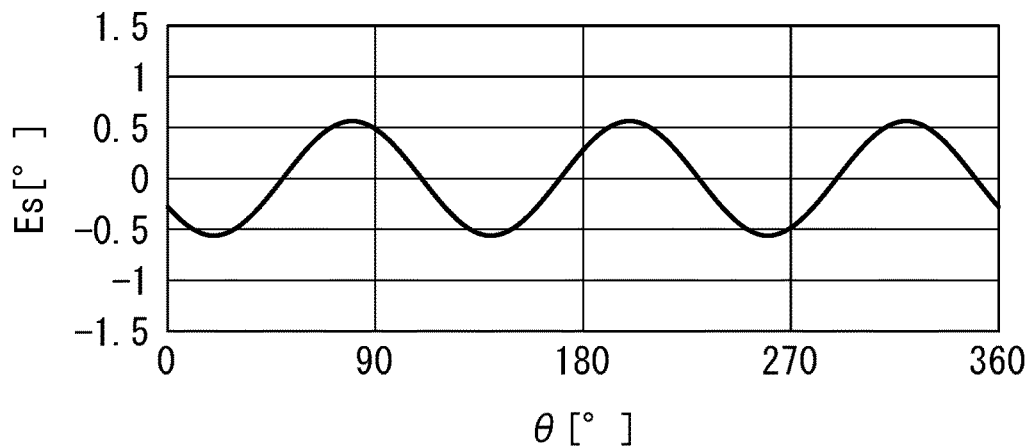
FIG. 32 is a waveform diagram illustrating a first example waveform of the angle error in Example 3 of the second embodiment of the invention.

FIG. 32 is a waveform diagram illustrating the waveform of the angle error Es when $A_4$ is −0.01. In FIG. 32, the horizontal axis represents the detection-target angle θ, and the vertical axis represents the angle error Es. If $A_4$ is −0.01, then $|A_1+A_2+A_4|$ is equal to $|A_1+A_2|\times0.5$. In this case, the maximum absolute value of the angle error Es is approximately one half that of the error Ep shown in FIG. 18.

Figure 33:
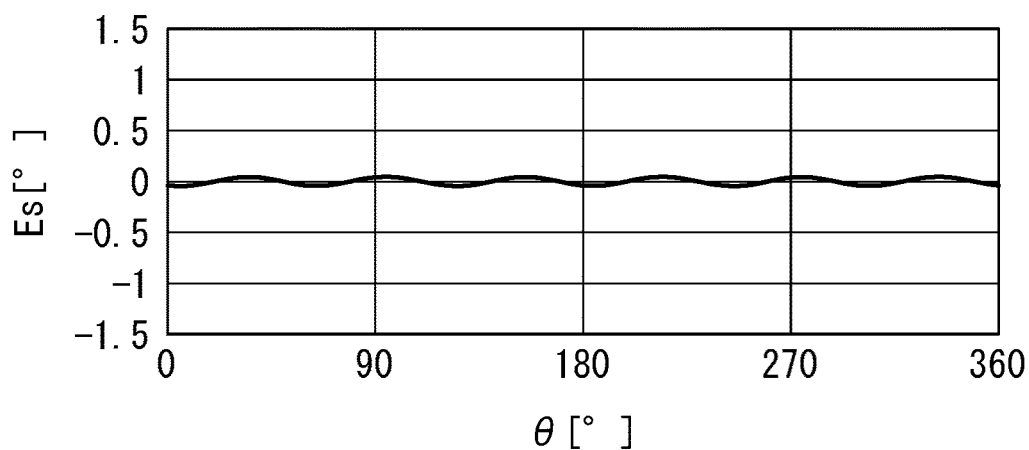
FIG. 33 is a waveform diagram illustrating a second example waveform of the angle error in Example 3 of the second embodiment of the invention.

FIG. 33 is a waveform diagram illustrating the waveform of the angle error Es when $A_4$ is −0.02. In FIG. 33, the horizontal axis represents the detection-target angle θ, and the vertical axis represents the angle error Es. If $A_4$ is −0.02, then $|A_1+A_2+A_4|$ is 0. In this case, the maximum absolute value of the angle error Es is much smaller than that of the error Ep shown in FIG. 18.

Example 4

Example 4 deals with a case where N is 4. Now, specific examples of the cases where $A_0=1$, $A_1=0.01$, $A_2=0.01$ and $\alpha=30°$ will be described with reference to FIG. 21, FIG. 34 and FIG. 35. The waveform of the error Ep of the uncorrected angle detection value θp in this case is as illustrated in FIG. 21.

Figure 34:
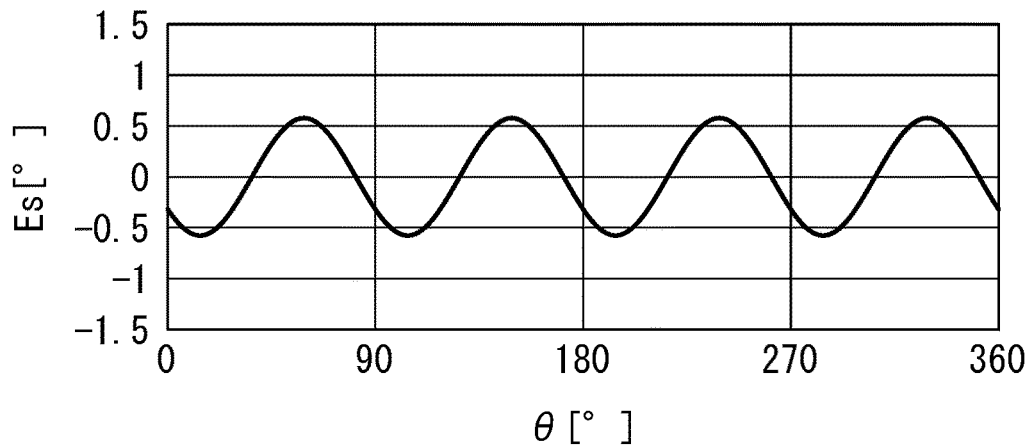
FIG. 34 is a waveform diagram illustrating a first example waveform of the angle error in Example 4 of the second embodiment of the invention.

FIG. 34 is a waveform diagram illustrating the waveform of the angle error Es when $A_4$ is −0.01. In FIG. 34, the horizontal axis represents the detection-target angle θ, and the vertical axis represents the angle error Es. If $A_4$ is −0.01, then $|A_1+A_2+A_4|$ is equal to $|A_1+A_2|\times0.5$. In this case, the maximum absolute value of the angle error Es is approximately one half that of the error Ep shown in FIG. 21.

Figure 35:
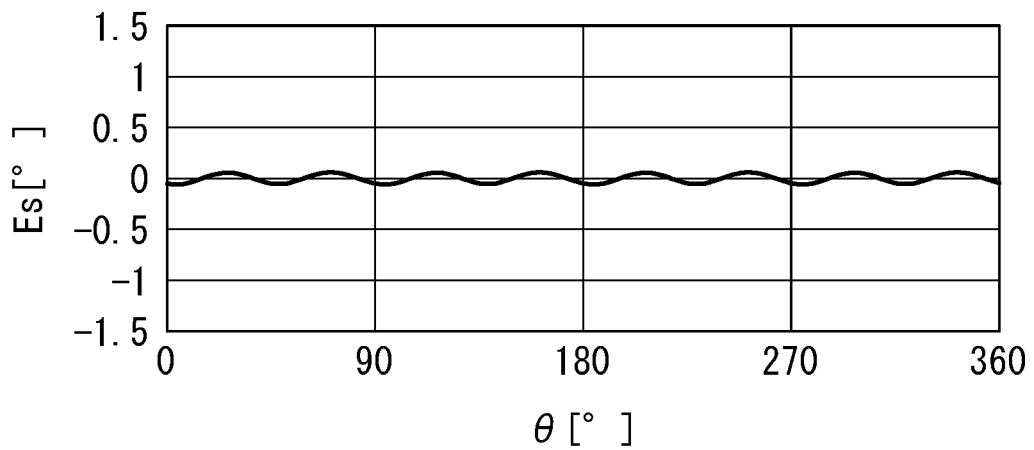
FIG. 35 is a waveform diagram illustrating a second example waveform of the angle error in Example 4 of the second embodiment of the invention.

FIG. 35 is a waveform diagram illustrating the waveform of the angle error Es when $A_4$ is −0.02. In FIG. 35, the horizontal axis represents the detection-target angle θ, and the vertical axis represents the angle error Es. If $A_4$ is −0.02, then $|A_1+A_2+A_4|$ is 0. In this case, the maximum absolute value of the angle error Es is much smaller than that of the error Ep shown in FIG. 21.

Example 5

Example 5 deals with a case where N is 5. Now, specific examples of the cases where $A_0=1$, $A_1=0.01$, $A_2=0.01$, and $\alpha=30°$ will be described with reference to FIG. 24, FIG. 36 and FIG. 37. The waveform of the error Ep of the uncorrected angle detection value θp in this case is as illustrated in FIG. 24.

Figure 36:
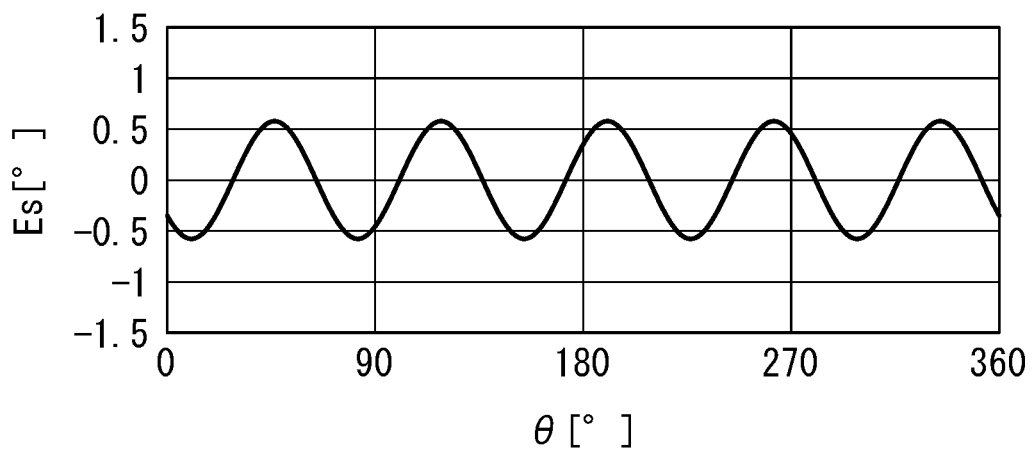
FIG. 36 is a waveform diagram illustrating a first example waveform of the angle error in Example 5 of the second embodiment of the invention.

FIG. 36 is a waveform diagram illustrating the waveform of the angle error Es when $A_4$ is −0.01. In FIG. 36, the horizontal axis represents the detection-target angle θ, and the vertical axis represents the angle error Es. If $A_4$ is −0.01, then $|A_1+A_2+A_4|$ is equal to $|A_1+A_2|\times0.5$. In this case, the maximum absolute value of the angle error Es is approximately one half that of the error Ep shown in FIG. 24.

Figure 37:
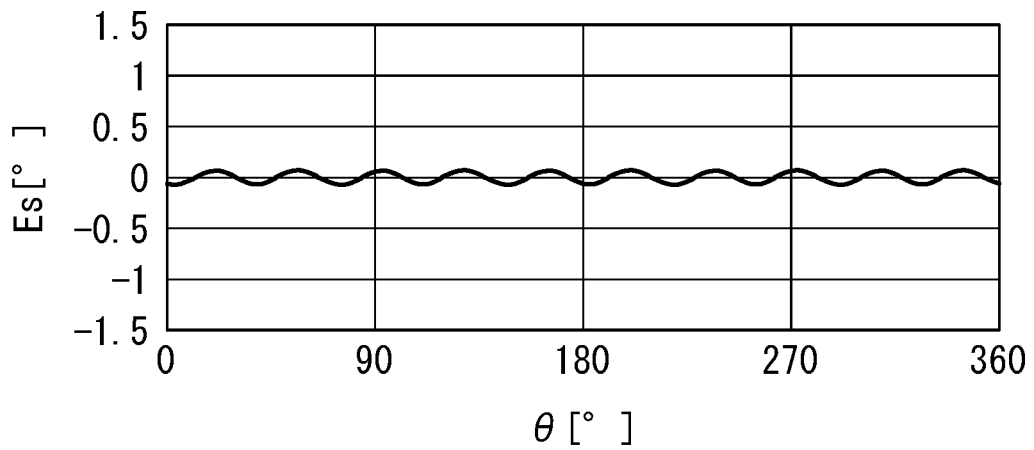
FIG. 37 is a waveform diagram illustrating a second example waveform of the angle error in Example 5 of the second embodiment of the invention.

FIG. 37 is a waveform diagram illustrating the waveform of the angle error Es when $A_4$ is −0.02. In FIG. 37, the horizontal axis represents the detection-target angle θ, and the vertical axis represents the angle error Es. If $A_4$ is −0.02, then $|A_1+A_2+A_4|$ is 0. In this case, the maximum absolute value of the angle error Es is much smaller than that of the error Ep shown in FIG. 24.

No specific examples are shown here for the cases where N is 6 or more. However, also in the cases where N is 6 or more, the present embodiment provides the same effects as those in the cases where N is 5 or less.

The configuration, operation and effects of the present embodiment are otherwise the same as those of the first embodiment.

The present invention is not limited to the foregoing embodiments but various modifications may be made thereto. For example, the present invention is also applicable to magnetic angle sensors in which elements that are other than magnetoresistive elements and configured to detect magnetic fields, such as Hall elements, are used as the magnetic detection elements.

Further, the present invention is applicable not only to magnetic angle sensors but to all types of angle sensors including optical angle sensors. The optical angle sensors may be ones configured to detect the relative position of an optical scale with respect to the angle sensor. The angle to be detected in such a case may be an angle that represents the relative position of the optical scale with respect to the angle sensor with one pitch of the optical scale as 360°.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A correction apparatus for use with a rotating magnetic field sensor, the rotating magnetic field sensor including: a detection signal generator for generating a first detection signal and a second detection signal each having a correspondence with a rotating magnetic field; and a detector for generating a detection value based on the first and second detection signals, the detection value having a correspondence with the rotating magnetic field, the correction apparatus being configured to correct the first and second detection signals, and comprising:

a correction processor configured to perform correction processing for generating a first corrected detection signal by adding a first correction value to the first detection signal and generating a second corrected detection signal by adding a second correction value to the second detection signal, wherein the first detection signal contains a first ideal component, a first signal error component, and a second signal error component, the second detection signal contains a second ideal component, a third signal error component, and a fourth signal error component, the first ideal component is expressed as $A_0 \sin \theta$, the second ideal component is expressed as $A_0 \cos \theta$, the first signal error component is expressed as $-A_1 \sin((N-1)\theta+\alpha)$, the second signal error component is expressed as $-A_2 \sin((N+1)\theta+\alpha)$, the third signal error component is expressed as $A_1 \cos((N-1)\theta+\alpha)$, and the fourth signal error component is expressed as $-A_2 \cos((N+1)\theta+\alpha)$, where $\theta$ represents an angle that has a correspondence with a rotating field angle, the rotating field angle being an angle that a direction of the rotating magnetic field at a reference position forms with respect to a reference direction in a reference plane; N is an integer greater than or equal to 1; $A_0$, $A_1$, and $A_2$ are real numbers other than 0; and $\alpha$ is a predetermined angle, a computed value of the angle $\theta$ without the correction processing being referred to as an uncorrected angle $\theta p$, the uncorrected angle $\theta p$ contains an error, and when the angle $\theta$ varies with a predetermined period T, the error of the uncorrected angle $\theta p$ contains a component resulting from the first to fourth signal error components and varying with a period of T/N, and the first correction value is expressed as $-A_3 \sin((N-1)\theta p+\alpha)$, and the second correction value is expressed as $A_3 \cos((N-1)\theta p+\alpha)$, where $A_3$ is a real number such that $|A_1+A_2+A_3|$ is less than $|A_1+A_2|$.

2. The correction apparatus according to claim 1, wherein $|A_1+A_2+A_3|$ is less than or equal to $|A_1+A_2|\times 0.5$.

3. The correction apparatus according to claim 1, wherein $|A_1+A_2+A_3|$ is 0.

4. A rotating magnetic field sensor comprising:
the correction apparatus according to claim 1;
a detection signal generator for generating the first detection signal and the second detection signal; and
a detector for generating the detection value.

5. The rotating magnetic field sensor according to claim 4, wherein
the first detection signal has a correspondence with a sine of the rotating field angle, and
the second detection signal has a correspondence with a cosine of the rotating field angle.

6. A correction apparatus for use with a rotating magnetic field sensor, the rotating magnetic field sensor including: a detection signal generator for generating a first detection signal and a second detection signal each having a correspondence with a rotating magnetic field; and a detector for generating a detection value based on the first and second detection signals, the detection value having a correspondence with the rotating magnetic field, the correction apparatus being configured to correct the first and second detection signals, and comprising:

a correction processor configured to perform correction processing for generating a first corrected detection signal by adding a first correction value to the first detection signal and generating a second corrected detection signal by adding a second correction value to the second detection signal, wherein the first detection signal contains a first ideal component, a first signal error component, and a second signal error component, the second detection signal contains a second ideal component, a third signal error component, and a fourth signal error component, the first ideal component is expressed as $A_0 \sin \theta$, the second ideal component is expressed as $A_0 \cos \theta$, the first signal error component is expressed as $-A_1 \sin((N-1)\theta+\alpha)$, the second signal error component is expressed as $-A_2 \sin((N+1)\theta+\alpha)$, the third signal error component is expressed as $A_1 \cos((N-1)\theta+\alpha)$, and the fourth signal error component is expressed as $-A_2 \cos((N+1)\theta+\alpha)$, where $\theta$ represents an angle that has a correspondence with a rotating field angle, the rotating field angle being an angle that a direction of the rotating magnetic field at a reference position forms with respect to a reference direction in a reference plane; N is an integer greater than or equal to 1; $A_0$, $A_1$, and $A_2$ are real numbers other than 0; and $\alpha$ is a predetermined angle, a computed value of the angle $\theta$ without the correction processing being referred to as an uncorrected angle $\theta p$, the uncorrected angle $\theta p$ contains an error, and when the angle $\theta$ varies with a predetermined period T, the error of the uncorrected angle $\theta p$ contains a component resulting from the first to fourth signal error components and varying with a period of T/N, and the first correction value is expressed as $-A_4 \sin((N+1)\theta p+\alpha)$, and the second correction value is expressed as $-A_4 \cos((N+1)\theta p+\alpha)$, where $A_4$ is a real number such that $|A_1+A_2+A_4|$ is less than $|A_1+A_2|$.

7. The correction apparatus according to claim 6, wherein $|A_1+A_2+A_4|$ is less than or equal to $|A_1+A_2|\times 0.5$.

8. The correction apparatus according to claim 6, wherein $|A_1+A_2+A_4|$ is 0.

9. A rotating magnetic field sensor comprising:
the correction apparatus according to claim 6;
a detection signal generator for generating the first detection signal and the second detection signal; and
a detector for generating the detection value.

10. The rotating magnetic field sensor according to claim 9, wherein
the first detection signal has a correspondence with a sine of the rotating field angle, and
the second detection signal has a correspondence with a cosine of the rotating field angle.

11. A correction method for correcting a first detection signal and a second detection signal each having a correspondence with a rotating magnetic field, wherein
the first detection signal contains a first ideal component, a first signal error component, and a second signal error component,
the second detection signal contains a second ideal component, a third signal error component, and a fourth signal error component,
the first ideal component is expressed as $A_0 \sin \theta$, the second ideal component is expressed as $A_0 \cos \theta$, the first signal error component is expressed as $-A_1 \sin ((N-1)\theta+\alpha)$, the second signal error component is expressed as $-A_2 \sin((N+1)\theta+\alpha)$, the third signal error component is expressed as $A_1 \cos((N-1)\theta+\alpha)$, and the fourth signal error component is expressed as $-A_2 \cos((N+1)\theta+\alpha)$, where $\theta$ represents an angle that has a correspondence with a rotating field angle, the rotating field angle being an angle that a direction of the rotating magnetic field at a reference position forms with respect to a reference direction in a reference plane; N is an integer greater than or equal to 1; $A_0$, $A_1$, and $A_2$ are real numbers other than 0; and $\alpha$ is a predetermined angle,
a computed value of the angle $\theta$ without the correction method being referred to as an uncorrected angle $\theta p$, the uncorrected angle $\theta p$ contains an error, and when the angle $\theta$ varies with a predetermined period T, the error of the uncorrected angle $\theta p$ contains a component resulting from the first to fourth signal error components and varying with a period of T/N, and
the correction method includes generating a first corrected detection signal by adding a first correction value to the first detection signal and generating a second corrected detection signal by adding a second correction value to the second detection signal, the first correction value is expressed as $-A_3 \sin((N-1)\theta p+\alpha)$, and the second correction value is expressed as $A_3 \cos((N-1)\theta p+\alpha)$, where $A_3$ is a real number such that $|A_1+A_2+A_3|$ is less than $|A_1+A_2|$.

12. The correction method according to claim 11, wherein $|A_1+A_2+A_3|$ is less than or equal to $|A_1+A_2|\times 0.5$.

13. The correction method according to claim 11, wherein $|A_1+A_2+A_3|$ is 0.

14. The correction method according to claim 11, wherein
the first detection signal has a correspondence with a sine of the rotating field angle, and
the second detection signal has a correspondence with a cosine of the rotating field angle.

15. A correction method for correcting a first detection signal and a second detection signal each having a correspondence with a rotating magnetic field, wherein
the first detection signal contains a first ideal component, a first signal error component, and a second signal error component,
the second detection signal contains a second ideal component, a third signal error component, and a fourth signal error component,
the first ideal component is expressed as $A_0 \sin \theta$, the second ideal component is expressed as $A_0 \cos \theta$, the first signal error component is expressed as $-A_1 \sin((N-1)\theta+\alpha)$, the second signal error component is expressed as $-A_2 \sin((N+1)\theta+\alpha)$, the third signal error component is expressed as $A_1 \cos((N-1)\theta+\alpha)$, and the fourth signal error component is expressed as $-A_2 \cos((N+1)\theta+\alpha)$, where $\theta$ represents an angle that has a correspondence with a rotating field angle, the rotating field angle being an angle that a direction of the rotating magnetic field at a reference position forms with respect to a reference direction in a reference plane; N is an integer greater than or equal to 1; $A_0$, $A_1$, and $A_2$ are real numbers other than 0; and $\alpha$ is a predetermined angle,
a computed value of the angle $\theta$ without the correction method being referred to as an uncorrected angle $\theta p$, the uncorrected angle $\theta p$ contains an error, and when the angle $\theta$ varies with a predetermined period T, the error of the uncorrected angle $\theta p$ contains a component resulting from the first to fourth signal error components and varying with a period of T/N, and
the correction method includes generating a first corrected detection signal by adding a first correction value to the first detection signal and generating a second corrected detection signal by adding a second correction value to the second detection signal, the first correction value is expressed as $-A_4 \sin((N+1)\theta p+\alpha)$, and the second correction value is expressed as $-A_4 \cos((N+1)\theta p+\alpha)$, where $A_4$ is a real number such that $|A_1+A_2+A_4|$ is less than $|A_1+A_2|$.

16. The correction method according to claim 15, wherein $|A_1+A_2+A_4|$ is less than or equal to $|A_1+A_2|\times 0.5$.

17. The correction method according to claim 15, wherein $|A_1+A_2+A_4|$ is 0.

18. The correction method according to claim 15, wherein
the first detection signal has a correspondence with a sine of the rotating field angle, and
the second detection signal has a correspondence with a cosine of the rotating field angle.

* * * * *